(12) United States Patent
Hebenthal et al.

(10) Patent No.: US 9,679,060 B2
(45) Date of Patent: Jun. 13, 2017

(54) FOLLOWING ONLINE SOCIAL BEHAVIOR TO ENHANCE SEARCH EXPERIENCE

(75) Inventors: Douglas C. Hebenthal, Redmond, WA (US); Cesare J. Saretto, Seattle, WA (US); Kathleen P. Mulcahy, Seattle, WA (US); James E. Allard, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/903,865

(22) Filed: Oct. 13, 2010

(65) Prior Publication Data
US 2012/0095976 A1    Apr. 19, 2012

(51) Int. Cl.
*G06F 17/30* (2006.01)

(52) U.S. Cl.
CPC ................ *G06F 17/30867* (2013.01)

(58) Field of Classification Search
CPC .................................. G06F 17/30867
USPC ........ 707/706, 722, 736, 758, 781, 999.003; 709/217; 715/768, 764, 769
See application file for complete search history.

(56) References Cited

U.S. PATENT DOCUMENTS

| | | | | |
|---|---|---|---|---|
| 7,113,917 | B2* | 9/2006 | Jacobi et al. | 705/14.53 |
| 7,685,192 | B1* | 3/2010 | Scofield et al. | 707/709 |
| 7,689,556 | B2* | 3/2010 | Garg et al. | 707/765 |
| 2006/0150180 | A1* | 7/2006 | Schmidt et al. | 717/173 |
| 2006/0173838 | A1* | 8/2006 | Garg et al. | 707/5 |
| 2007/0100796 | A1* | 5/2007 | Wang | 707/3 |
| 2007/0265905 | A1* | 11/2007 | Lazier | 705/10 |
| 2008/0059455 | A1 | 3/2008 | Canoy et al. | |
| 2008/0082491 | A1* | 4/2008 | Scofield et al. | 707/3 |

(Continued)

FOREIGN PATENT DOCUMENTS

| | | |
|---|---|---|
| CN | 1968372 A | 5/2007 |
| CN | 101189608 | 5/2008 |

(Continued)

OTHER PUBLICATIONS

Carmel, David, et al., "Personalized Social Search Based on the User's Social Network", The 18th ACM Conference on Information and Knowledge Management, Nov. 2-6, 2009, pp. 1227-1236, Association for Computing and Machinery, New York, NY.

(Continued)

*Primary Examiner* — Syling Yen
(74) *Attorney, Agent, or Firm* — Vierra Magen Marcus LLP

(57) ABSTRACT

Systems and methods are disclosed for customizing a user's experience with an application such as a search engine application. The user's experience is customized based on inferring a mood and/or interests of the user at least in part from an analysis of the user's posts on one or more social media sites. The search engine application is configured to include a user-following engine which follows a user's activities on social media websites. By tracking a user's posts and other activity on social media websites, and possibly those of his or her friends, the user-following engine is able to draw inferences about a user, including for example the user's emotional state, current trending interests, future plans, likes/dislikes and aspirations. The user-following engine may then customize the user's search experience based on these drawn inferences.

14 Claims, 17 Drawing Sheets

(56) References Cited

U.S. PATENT DOCUMENTS

| | | | |
|---|---|---|---|
| 2008/0091834 A1 | 4/2008 | Norton | |
| 2009/0048904 A1* | 2/2009 | Newton et al. | 705/10 |
| 2009/0055385 A1* | 2/2009 | Jeon et al. | 707/5 |
| 2009/0132365 A1 | 5/2009 | Gruenhagen et al. | |
| 2009/0164400 A1* | 6/2009 | Amer-Yahia et al. | 706/45 |
| 2009/0164897 A1 | 6/2009 | Amer-Yahia et al. | |
| 2009/0164929 A1* | 6/2009 | Chen et al. | 715/769 |
| 2009/0276230 A1* | 11/2009 | Smyers et al. | 705/1 |
| 2010/0076955 A1* | 3/2010 | Van Steenbergen et al. | 707/711 |
| 2010/0082593 A1 | 4/2010 | Singh | |
| 2010/0198944 A1* | 8/2010 | Ho et al. | 709/217 |
| 2010/0228590 A1* | 9/2010 | Muller et al. | 705/10 |
| 2010/0250558 A1* | 9/2010 | Wang | 707/749 |
| 2011/0040848 A1* | 2/2011 | Xu | 709/213 |
| 2011/0055017 A1* | 3/2011 | Solomon et al. | 705/14.66 |
| 2011/0055400 A1* | 3/2011 | Alexander | 709/226 |
| 2011/0119610 A1* | 5/2011 | Hackborn et al. | 715/768 |
| 2011/0148916 A1* | 6/2011 | Blattner | 345/619 |
| 2011/0173176 A1* | 7/2011 | Christensen et al. | 707/709 |
| 2011/0179385 A1* | 7/2011 | Li et al. | 715/810 |
| 2011/0307464 A1* | 12/2011 | Ghosh | 707/706 |

FOREIGN PATENT DOCUMENTS

| | | |
|---|---|---|
| CN | 101213850 A | 7/2008 |
| CN | 101405720 A | 4/2009 |
| CN | 101576804 A | 11/2009 |
| CN | 101779180 | 7/2010 |

OTHER PUBLICATIONS

Chen, Ling, et al., "PHAROS—Personalizing Users' Experience in Audio-Visual Online Spaces", The 34th International Conference on Very Large Data Bases, Aug. 24-30, 2008, pp. 1-8, Association for Computing and Machinery, New York, NY.

Google Social Search: Features. Google Web Search Help [retrieved on Jul. 26, 2010]. Retrieved from the Internet: <URL: http://www.google.com/support/websearch/bin/answer.py?hl=en&answer=165228>.

Kim, Dongwoo, et al., "Analysis of Twitter Lists as a Potential Source for Discovering Latent Characteristics of Users (Abstract)", The 28th ACM Conference of Human Factors in Computing Systems, Apr. 10-15, 2010, pp. 1-4, Association for Computing and Machinery, New York, NY.

Naone, Erica, "Social Search," Technology Review India [online], Feb. 1, 2008 [retrieved on Jul. 26, 2010]. Retrieved from the Internet: <URL: www.technologyreview.in/web/20138>.

Office Action dated Dec. 18, 2013 in Chinese Patent Application No. 201110321267.7.

Partial English translation of Office Action dated Dec. 18, 2013 in Chinese Patent Application No. 201110321267.7.

Response to Office Action, and partial English translation thereof, filed Sep. 9, 2014 in Chinese Patent Application No. 201110321267.7.

Response to Office Action, and partial English translation thereof, filed May 5, 2014 in Chinese Patent Application No. 201110321267.7.

Office Action, and partial English translation thereof, dated Jun. 24, 2014 in Chinese Patent Application No. 201110321267.7.

"Third Office Action and Search Report Issued in Chinese Patent Application No. 201110321267.7", Mailed Date: Dec. 2, 2014, 15 Pages.

"Office Action Issued in Chinese Patent Application No. 201110321267.7", Mailed Date: May 21, 2015, 9 Pages.

Response to Office Action, and partial English translation, filed Feb. 15, 2015 in Chinese Patent Application No. 201110321267.7.

Response to Office Action, and partial English translation, filed Sep. 7, 2015 in Chinese Patent Application No. 201110321267.7.

Response to Notice on Reexamination, and partial English translation, filed May 3, 2016 in Chinese Patent Application No. 201110321267.7.

Notice on Reexamination, and partial English translation, dated Mar. 15, 2016 in Chinese Patent Application No. 201110321267.7.

"Fourth Office Action and Search Report Issued in Chinese Patent Application No. 201110321267.7", Mailed Date: Nov. 18, 2016, 11 Pages.

* cited by examiner

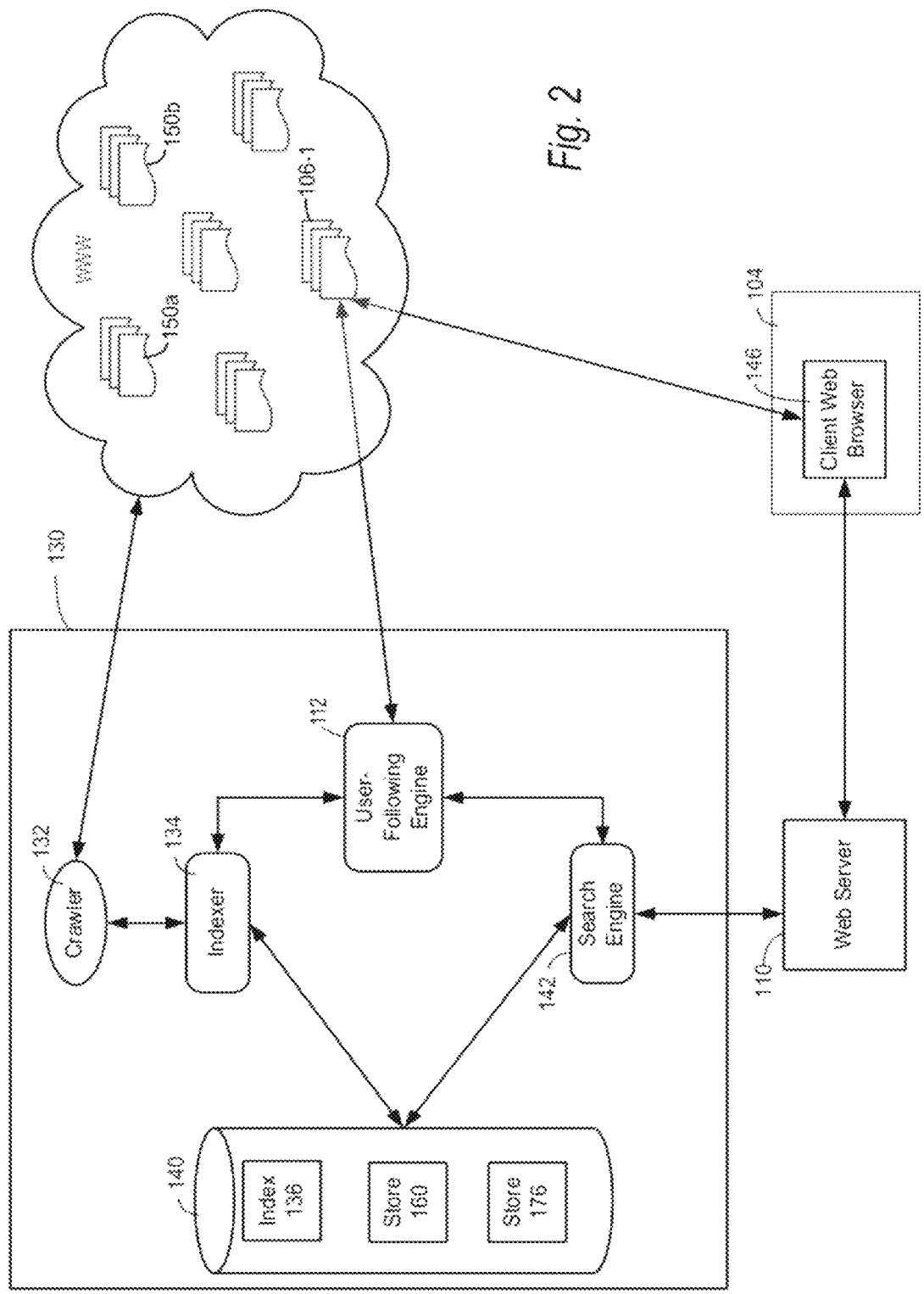

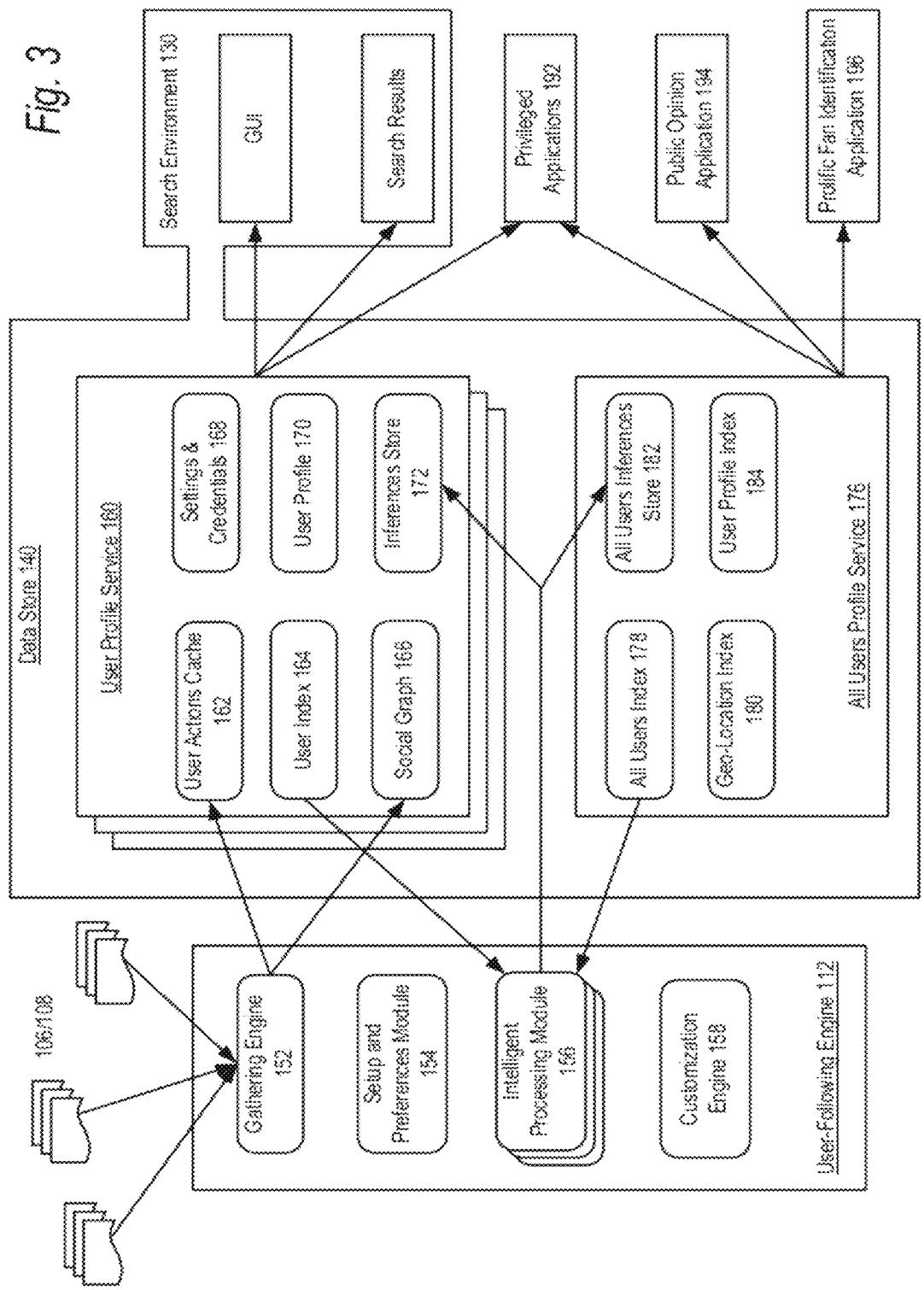

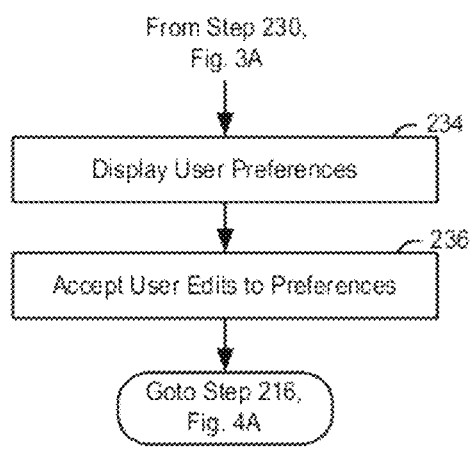
Fig. 4B
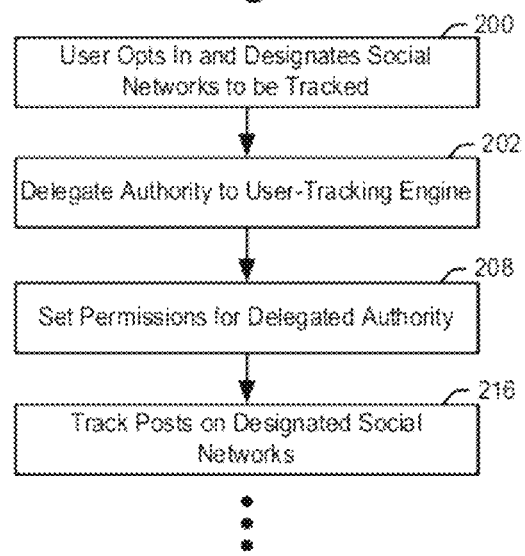
Fig. 4C
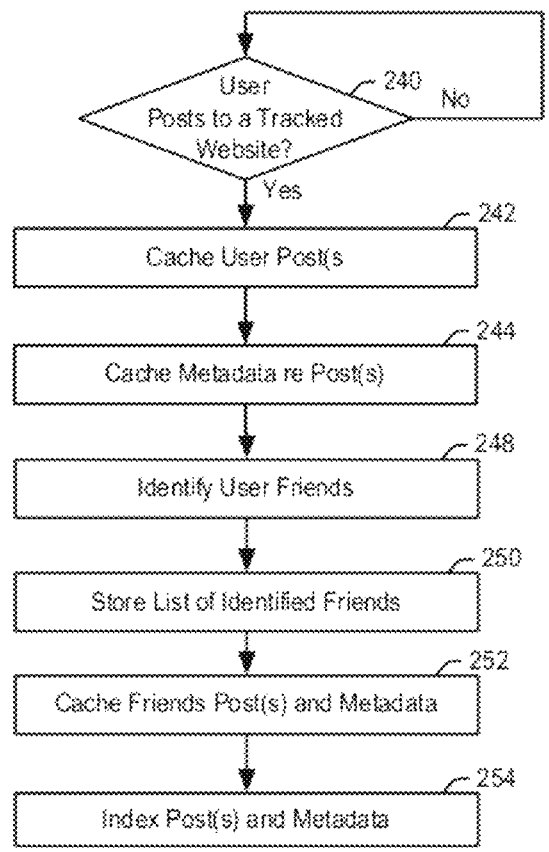
Fig. 5 (Step 216)

FOLLOWING ONLINE SOCIAL BEHAVIOR TO ENHANCE SEARCH EXPERIENCE

BACKGROUND

Every day, users share a wealth of information about themselves with their friends and sometimes the general public via social websites such as Twitter, Facebook, MySpace and other social networking platforms and blogs. Users share how they are feeling, what they are doing, what they are thinking, experiences they've had, etc. Currently, search engines and other web-enabled applications take no advantage of the insights available by tracking the information that users are sharing.

Search engines in particular are well situated to take advantage of such insights as they are treated as trusted advisors by their users. Where a user has a question, they often turn to their search engine to provide the answer. However, as noted, conventional search engines do not use information which may be known about a user to personalize a user's search experience.

SUMMARY

Disclosed herein are systems and methods for customizing a user's experience with an application such as a search engine application. The user's experience is customized based on inferring a mood and/or interests of the user at least in part from an analysis of the user's posts on one or more social media sites. The search engine application is configured to include a user-following engine which follows a user's activities on social media websites. By tracking a user's posts and other activity on social media websites, and possibly those of his or her friends, the user-following engine is able to draw inferences about a user, including for example the user's emotional state, current trending interests, future plans, likes/dislikes and aspirations. The user-following engine may then customize the user's search experience based on these drawn inferences.

In one example, the present technology relates to a method of enhancing a user interaction with a privileged application. The method includes the steps of: (a) following the online activity of a user on one or more social media sites; (b) analyzing the user activity on the social media sites followed in said step (a) to correlate the user's activity with a user's interests and/or mood; and (c) customizing the user experience with the privileged application based on the interests and/or mood of the user correlated in said step (b).

In another example, the present technology relates to a system for inferring a mood and/or interests of a user at least in part based on the user's interaction with one or more social media sites. The system comprises: a user-following engine including: a gathering engine for following the user to the one or more social media sites and copying posts of the user from the one or more social media sites, and one or more processing modules for analyzing the posts gathered by the gathering engine and inferring the mood and/or interests of the user from the posts; and a data store for storing indications of the mood and/or interests inferred by the one or more processing modules.

In a further example, the present technology relates to a method of enhancing a user experience with a search processing environment including a search engine, the method comprising: (a) inferring at least one of a mood of a user and an interest of the user from analysis of the user's posts on one or more social media sites; and (b) customizing the user's interactive experience with the search processing environment via the user interface based at least in part on the mood and/or interest inferred for the user in said step (a).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a block diagram of a search engine application for implementing a user-following engine according to embodiments of the present system.

FIG. 3 is a block diagram showing further detail of a user-following engine and data store for implementing embodiments of the present system.

FIGS. 4A and 4B are a flowchart of an embodiment for setting up a user-following engine, modifying user preferences and modifying stored inferences of the user-following engine.

FIG. 4C is an alternative embodiment showing alternative steps to a portion of the process explained with respect to FIG. 4A.

FIG. 5 is a flowchart showing further detail of step 216 of FIGS. 4A and 4C.

DETAILED DESCRIPTION

Embodiments of the present technology will now be described with reference to FIGS. 1-17, which in general relate to systems and methods for customizing a user's experience with an application such as a search engine application. The user's experience is customized based on inferring a mood and/or interests of the user at least in part from an analysis of the user's posts and activity on one or more social media sites. In embodiments, the search engine application includes a user-following engine having a gathering engine and one or more intelligent processing modules. The gathering engine follows the user to one or more social media sites and copies the user's posts and other activity to a storage location in the search engine application. The one or more intelligent processing modules thereafter analyze the posts and activity and infer a mood of the user and/or interests of the user based on mood and interest indicators in the posts. In further embodiments, the gathering engine and one or more intelligent processing modules may be incorporated into a single operative routine in the user-following engine. In such embodiments, user posts and those of a user's friends may be tracked and analyzed for inferences without having to copy the posts to the storage location.

Using the identified inferences, the user-following engine may then customize the user's search experience. The experience may be customized by personalizing an appearance of a graphical user interface of the search engine and/or by personalizing the results returned by the search engine for a user query. In embodiments, the user-following engine may also track the posts and activities of online friends of the user on the one or more social media sites. In such embodiments, the one or more intelligent processing modules may factor in the friends' posts when performing its analysis and generating inferences about the user's mood and/or interests.

In embodiments, the user-following engine may also track the posts and activities of a group of users, and generate inferences relating to a mood and/or interests for the group as a whole. This information may then be used by other applications, for example to gauge public opinion on one or more topics, and to allow identification of users who are prolific and/or influential in their postings with respect to one or more topics. Each of these concepts is explained in greater detail below.

Figure 1:
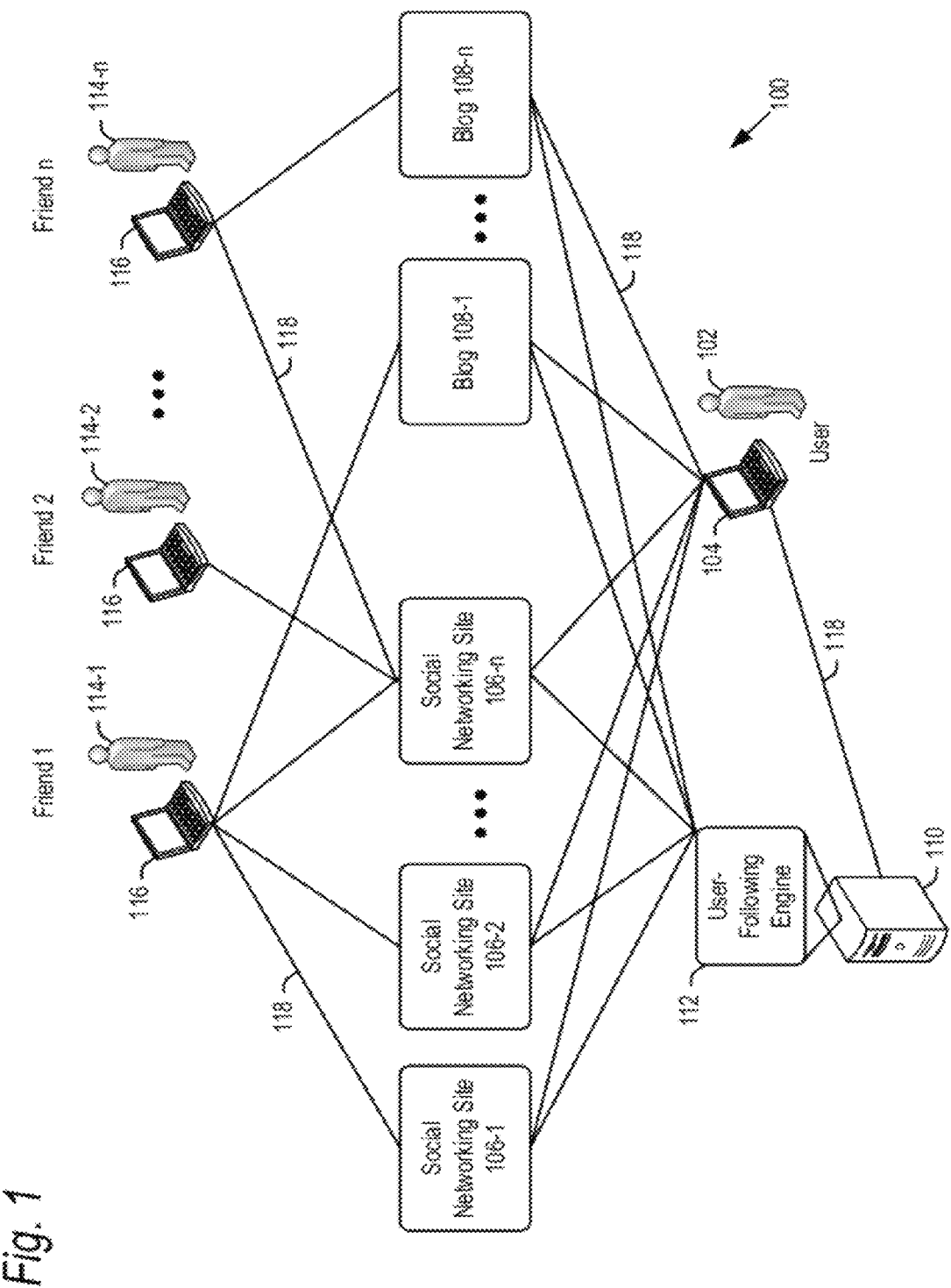
FIG. 1 is a block diagram of a network architecture for implementing embodiments of the present system.

FIG. 1 is an illustrative example of a network architecture 100 according to the present technology. The architecture 100 shows a user 102 connected via a computing device 104 to a plurality of social networking sites 106-1, 106-2, . . . , 106-n, and a plurality of blogs 108-1, . . . 108-n. The present technology further includes a computing device 110 running a user-following engine 112 which tracks a user's activity on the social networking sites 106 and/or blogs 108. As explained below, the user-following engine 112 may be part of a search engine responsive to queries from user 102. The particular architecture shown in FIG. 1 is by way of example only, and it is understood that the user-following engine 112 may track the activity of user 102 only on a single social networking site 106, a single blog 108, or any number of social networking sites 106 and/or blogs 108. One or more social networking sites 106 and/or blogs 108 may at times be referred to collectively herein as "social media sites."

Social networking sites 106 may be online platforms and/or websites that allow users to build and maintain social networks with each other. A social network may be a group of people choosing to interact with each other based on a commonality such as friendship, business, common interests or activities, etc. Social networking sites 106 allow a user to share ideas, activities, events, sentiments, interests, aspirations and other information about the user with others by posting this information on a site 106. Some examples of known social networking sites 106 include, but are not limited to: Facebook®, MySpace®, Twitter®, Linkedin®, Ning®, Tagged®, Classmates®, Hi5®, MyYearbook®, Meetup®, Bebo®, Mylife®, Friendster®, MyHeritage®, Multiply®, Orkut®, Foursquare®, Digg®, Match® and the Xbox® Live gaming service.

Blogs 108 may be online platforms and/or websites maintained by individuals or entities which provide commentary, descriptions of events, or other material to users that access the blogs. Blogs 108 may allow users to post comments and message each other. Some examples of known blogs 108 include, but are not limited to: TMZ®, Buffington Post®, Engadget®, Gizmodo®, Mashable™, TechCrunch®, Gawker® and FanHouse®. As is known, blogs 108 may be set up for example by blogging and website creation platforms such as Blogger® and WordPress®.

As is known, the social media sites 106, 108 are set up so that the user can connect with others by posting content to social media sites 106, 108. In one example, user 102 may accept friends; that is, others who wish to be connected with the user 102 and have access to the information the user posts. In a further example, a user may post content publicly to a social media site 106, 108 so that it may be viewed by anyone accessing the social media site 106, 108.

FIG. 1 further shows friends 114-1, 114-2, . . . , 114-n connected via respective computing devices 116 to one or more of the social media sites 106, 108 that the user 102 is connected to. The user may have different friends 114 on different social media sites 106, 108. A user may also set up his or her profile on social media sites 106, 108 so that the information they provide is available to the general public. Alternatively, a user 102 may set it up so that their information is available only to friends that have been granted permission by the user to receive the user's information.

Each of the lines shown in FIG. 1 may represent a network connection 118, which may for example be the Internet. In embodiments described below, the user 102 may connect to the social media sites 106, 108 via a web browser on the user's computing device 104. However, it is understood that the user 102 (and friends 114) may communicate with social media sites 106, 108 via other applications such as email and/or instant messaging. It is further understood that the user computing device 104 and friend computing devices 116 may be any of various computing devices including but not limited to desktop computers, laptop computers, tablets, cellular telephones, television/set top boxes, video game consoles, automobiles and smart appliances. Moreover, the user 102 may use different computing devices 104 at different times to connect to the social networking sites 106 and blog 108, as may friends 114. The computing device 110 may for example be one or more servers, a multiprocessor system, mainframe computers or a distributed computing environment. Other devices are contemplated. One example of a computing device which may serve as devices 104, 116 and/or 110 is described in greater detail below with respect to FIG. 17.

FIG. 2 is block diagram of a search application, also called search processing environment 130, including software modules and data structure on which the present technology may be implemented. One example of a search processing environment 130 into which the present technology may be incorporated and used is the Bing™ search engine software by Microsoft Corporation of Redmond, Wash. The search processing environment 130 can operate with and/or as part of the computing device 110 mentioned above and explained in greater detail below.

Search processing environment 130 may include a software routine known as a spider, or crawler, 132. The spider 132 visits websites 150 on the World Wide Web, and retrieves content from its pages. The spider may return to websites on a regular basis to look for changes. The basic algorithm executed by the web crawler takes a list of seed URLs as its input and repeatedly: removes a URL from the URL list, determines the IP address of its host name, downloads the corresponding document, and extracts any links contained in it. For each of the extracted links, the crawler may translate it to an absolute URL (if necessary), and add it to the list of URLs to download, provided it has not been encountered before.

The pages retrieved by the spider 132 go into an index 136 stored within a data store 140. The index 136, sometimes called the catalog, is a repository containing a copy of every web page that the spider finds. Retrieved web pages are organized in the index 136 by indexer 134. Indexer 134 collects, parses, and stores data in the index 136 to facilitate fast and accurate information retrieval. Embodiments of the indexer 134 stores full-text, natural language documents from websites 150. Media types such as video, audio and graphics may also be retrieved and indexed for searching.

The search processing environment 130 may further include a search engine 142. The search engine sifts through the millions of pages recorded in the index to find matches to a search and ranks them in order of what it believes is most relevant. Searching through an index involves a user building a query and submitting it through the search engine. The query can be a single word at minimum, or may be a series of words or phrases. Building a more complex query is also possible with the use of Boolean operators that allow a user to refine and extend the terms of the search. It is understood that the search processing environment 130 may include a variety of other components than are shown in FIG. 2, including for example a page ranking algorithm and a variety of other components for processing the index 134.

In practice, user 102 of computing device 104 accesses search processing environment 130 via a web browser 146 on the client side and a web server, for example computing device 110, on the host side. Once a communication link is established between client and host, the user 102 may perform query searches as described above.

In accordance with embodiments of the technology, search processing environment 130 may further include user-following engine 112 for following the user 102 as the user 102 interacts with social media sites 106, 108 (such as social networking site 106-1 shown in FIG. 2). Information tracked by the user-following engine 112 may be stored in a user profile service 160 and/or an all users profile service 176, explained below.

The user-following engine 112 is set up by the user 102 so that the user-following engine 112 can track, or "listen to" the information the user posts to the site 106-1 as well as any other social media sites 106, 108 the user visits. The user-following engine can also listen to the posts of the user's friends 114. The user 102 may set up the user-following engine 112 to track the user's posts, and those of the user's friends, at least one of two ways. In one embodiment, a user may grant the user-following engine 112 delegated authorization to access the social media sites 106, 108 and act on behalf of the user. Social media sites 106, 108 may use known authentication and authorization protocols, such as OAuth WRAP or OAuth 2.0, which allow the user 102 to set up the user-following engine 112 to act on behalf of the user on the social media sites. In this embodiment, the user-following engine 112 may negotiate with application programming interfaces (APIs) of a social media site 106, 108 to gain access to social media site as the user, in accordance with permissions set by the user. Once on the site, the user-following engine 112 may track posts of the user, and may have access to posts of the user's friends. In particular, where a friend 114 posts and sets privileges for the user 102 (and for example none others) to view that post, the user-following engine would have access to that confidential friend post when connected via delegated authority. In an alternative embodiment to delegated authority, the user may set up the user-following engine with permissions so that the user-following engine is made a friend/follower of the user. The user-following engine 112 would thereafter have access to what the user posts, and possibly the posts of the user's friends. Other methods are contemplated whereby the user-following engine may be able to follow the posts of the user 102 and/or the user's friends.

Through listening to the user's posts, and possibly those of the user's friends, the user-following engine is able to draw inferences, for example about the user's emotional state, current trending interests, future plans, likes/dislikes and aspirations. The user-following engine 112 may then customize the user's search experience with search processing environment 130 based on the drawn inferences.

Further details of the architecture of the user-following engine 112 will now be explained with reference to the block diagram of FIG. 3 and the flowcharts of FIGS. 4A-13. Data store 140 of the search processing environment 130 may include a user profile service 160 which stores information relating to user 102. The data store 140 may further include an all users profile service 176 which stores aggregate information on all users of the search processing environment 130. The user-following engine 112 generates information regarding user 102, as well as all other users, which information is stored in user profile service 160 and all users profile service 176 as explained below.

The user-following engine 112 includes a setup and user preferences module 154. Referring to the flowchart of FIG. 4A, one function of module 154 is to allow a user to opt into the user following system of the present technology. In embodiments, a user may run module 154 by selecting an option from a graphical user interface presented by the search processing environment 130. Once the module 154 is launched, a user may opt into the user following system in step 200. The user may also designate in step 200 which social media sites 106, 108 the system is to track for the user.

In step 204, the user 102 may provide a name and/or ID for the user on each social media site 106, 108 the system is to track. The user 102 may have a mosaic of different identities that he or she uses on different social media sites 106, 108, or even on a single social media site 106, 108. The system may be alerted as to this mosaic of different identities in step 204 so that the user-following engine 112 can follow the user regardless of which identity he or she is using.

In step 206, the setup and preferences module 154 may next prompt the user as to whether he or she has a private profile on one or more of the social media sites 106, 108. If so, the module 154 may generate a friend request which is sent to the user from the specified social media sites 106, 108 having private user profiles. In order for this to happen, in embodiments, the user-following engine may have one or more user accounts set up on all (or many) of the known social networking sites 106 and blogs 108. This may be done by a network administrator or automatically by an API which enables automatic account setup for the user-following engine 112 on the social media sites 106, 108.

Thereafter, the user-following engine may generate and send a friend request to the user through the specified social media sites 106, 108. The friend request will appear to the specified social media sites 106, 108 as a friend request from any other friend, such as friends 114 in FIG. 1. Upon receipt of the friend request from the user-following engine 112, the user 102 may accept that request in step 212. If accepted, this will allow the user-following engine 112 to track the private posts and activities of user 102 on the specified social media sites 106, 108. If for some reason the user 102 does not accept the friend request in step 212, the user may be prompted in step 214 to either accept the request or remove that private social media site 106, 108 from those which are tracked.

Figure 4A:
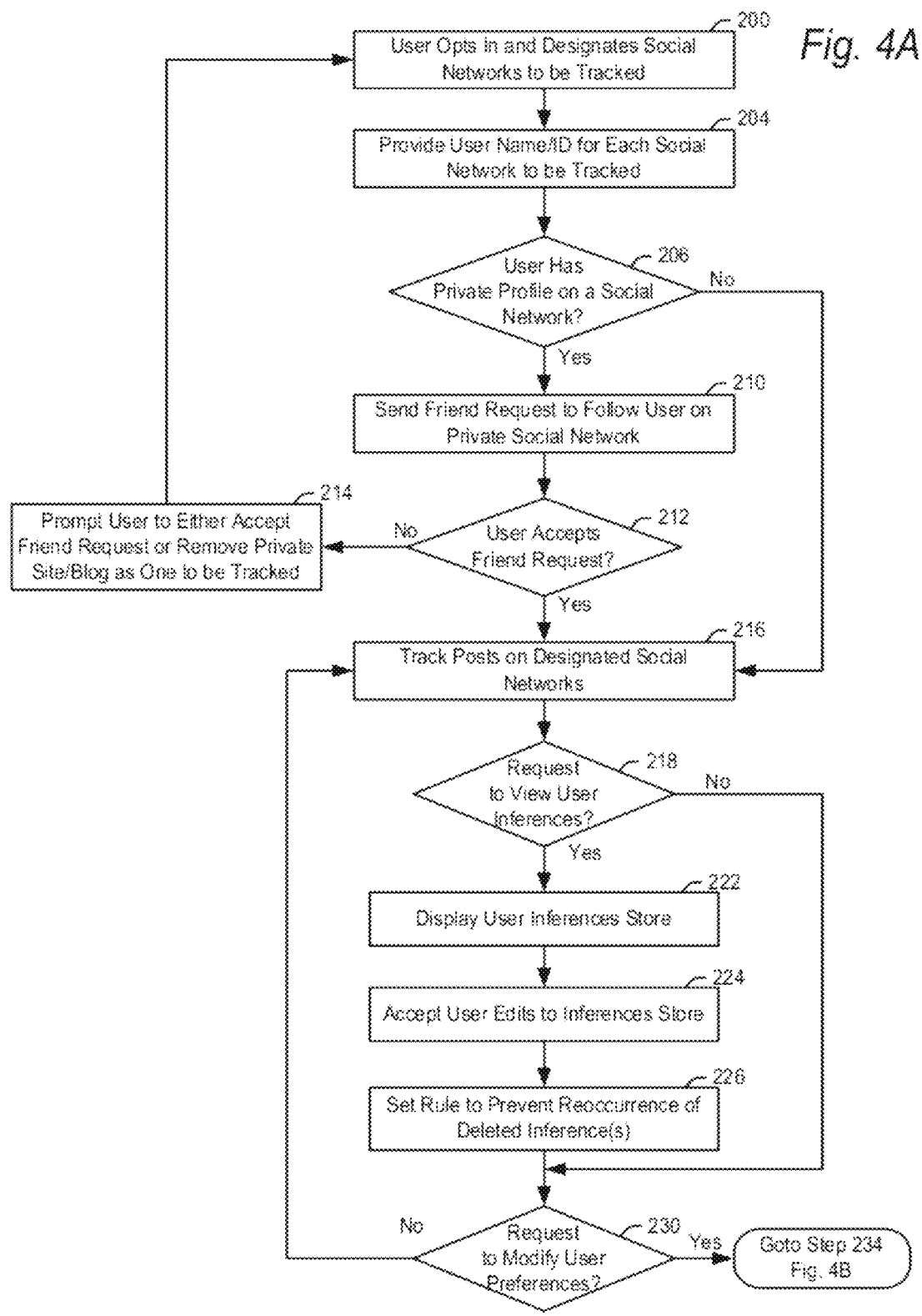

As noted above, instead of setting up the user-following engine 12 as a friend of user 102, the user may instead delegate authority to the user-following engine for the engine to act as the user on social media sites 106, 108. FIG. 4C shows a portion of FIG. 4A where the above-described steps 204, 206, 210, 212 and 214 relating to setting up the user-following engine as a friend are omitted. Instead, in the embodiment of FIG. 4C, the setup and preferences module 154 may perform step 202 of delegating authority to the user-following engine 112, and allowing the user to set permissions in step 208. The remaining steps of the embodiment of FIG. 4C may be the same as in FIGS. 4A and 4B described below.

In step 216, the user-following engine 112 may track posts and other activities of user 102 on the social media sites 106, 108. Where the user 102 has a private profile, the user-following engine 112 may track the user's activities through delegated authority or by friending the user 102 as described above. Where the user's profile on a social media site 106, 108 is public, the user-following engine 112 may track the user's activity with knowledge of the user's ID and without friending the user 102 (although the user-following engine 112 may friend the user in this instance anyway).

Further details of user-following step 216 are now described with reference to FIG. 3 and the flowchart of FIG. 5. In step 240, the user-following engine 112 may detect when a user is posting to a social networking site 106 or blog 108. The user account for the user-following engine 112 may specify that a social media site 106, 108 is to send a notification when user 102 posts. Alternatively, the user-following engine 112 may track the user's social media sites 106, 108 continuously. One way this may be done is to monitor the stream of data on a social media site 106, 108 for certain cues relating to the data of interest to the user-tracking engine 112.

The user-following engine 112 may further include a gathering engine 152 having APIs configured to identify posts from user 102 and to copy those posts in step 242 into a user actions cache 162 of user profile service 160. The user's posts may for example be text, images, video and/or audio (including the data itself or a link to a location where the data is located). All formats may be copied and stored by the gathering engine 152. The user may also perform other activities on a social media site 106, 108 which may be detected and copied by the gathering engine 152. For example, a user may have a status on a social media site 106, 108 which may be noted and copied by the gathering engine 152. A user may further perform administrative or user-preference related activities on the social media site 106, 108, which activities are also identified and stored by the gathering engine 152. In further embodiments, data including user and friend posts may be identified, but not copied to cache 162. In such embodiments, the identified posts may be analyzed for inferences as explained below. The identified inferences may be stored, but the user and friend posts would not be stored.

In step 244, the gathering engine 152 may further copy and store metadata relating to a user's activities on a social media site 106, 108. This metadata may include for example an identification of the social media site 106, 108, a date and time of the user activity, a device 104 used by the user 102 to connect to the social media site 106, 108 and a location of the user 102 when the connection was made (assuming the device 104 has a global positioning system (GPS) or other means for identifying a user's position when the user posted to the social media site 106, 108). The metadata that is stored may include different or additional information in further embodiments.

In step 248, the gathering engine 152 may further detect friends 114 of the user 102 on the contacted social media site 106, 108 (where such information is provided by a site 106/blog 108). If available, the gathering engine 152 may store a list of these friends in step 250 in a social graph store 166 in user profile service 160. The gathering engine 152 may further copy and store posts by the user's friends 114 in step 252 (this may occur whether or not the user has made a post). While the friends 114 may not be associated with the user-following engine 112, the gathering engine 152 is able to obtain this information by virtue of the connection between the user 102 and the user's friends 114.

The information obtained by the gathering engine 152 and cached in the user actions cache 162 may be indexed in step 254. The indexing may be performed by the same indexer 134 (FIG. 2) described above. Alternatively, a separate indexer may be used to index the information obtained by the gathering engine 152. The indexed information may be stored in user index 164 of user profile service 160. The posts and activities of the user 102 may be indexed separately from the posts and activities noted for friends 114 of the user 102. In this manner, all posts and other activity of a user and his or her friends are gathered and stored by the present system. Where posts are text, the posts may be stored as full-text natural language entries in user index 164. Graphical images, video and/or audio data may also be indexed and stored.

As explained below, the user-following engine 112 further includes intelligent processing modules 156 for analyzing the indexed information for user 102 and his or her friends 114, and coming up with inferences which may be drawn about the user 102. All such inferences may be stored in a user inferences store 172 in user profile service 160. It is a further feature of the present system that a user be able to easily view all such inferences in user inferences store 172 and to modify or delete those inferences. Referring again to the block diagram of FIG. 3 and the flowchart of FIG. 4A, the setup and preferences module 154 may check for a user request to view user inferences in step 218. This may for example be an option provided on the graphical user interface presented by the search processing environment 130 as explained below.

If a user request to view user inferences is received in step 218, the inferences that have been drawn from the indexed information may be displayed to the user 102 in step 222. In the event a user disagrees with an inference, or agrees with an inference but wishes to change it nonetheless, the setup and preferences module 154 accepts changes to the stored inferences from the user 102 in step 224. Moreover, the user may set preference rules that prevent reoccurrence of the removed inferences in step 226.

In step 230, the setup and preferences module 154 may further check whether the user wishes to review and/or change other user preferences that are set. This may for example be an option provided on the graphical user interface presented by the search processing environment 130. The user preferences may for example be stored in a settings and credentials store 168 and/or a user profile 170 in user profile service 160. Preferences in settings and credentials store 168 may come from a user setting those directly. The preferences set in user profile 170 may be taken from user preferences scraped by the gathering engine 152 from the social media sites 106, 108. The settings and credentials store 168 and user profile 170 may be combined in further embodiments.

If the user elects to view his or her preferences in step 230, the user preferences may then be displayed to the user in step 234 (FIG. 4B), and any changes to the user preferences are accepted in step 236. There are a wide variety of user preferences which may be set in this way. For example, a user may set rules as to what social media sites 106, 108, posts or topics the gathering engine 152 is to ignore. A user may set preferences as to friends, such as to weight posts from certain friends higher or lower, or to ignore posts from certain friends. Other user preferences may be set or altered in this way.

As described above, the setup and user preferences module 154 performs at least three functions. The module 154 may be used to setup the social media sites 106, 108 that the system is to follow. The module 154 may be used to view and modify inferences that have been created for a user. And the module 154 may be used to view and modify user preferences. It is understood that these functions may be performed by two or more separate modules in further embodiments.

The operation of the intelligent processing modules 156 to generate inferences about the user 102 will now be explained with reference to the block diagram of FIG. 3 and the flowcharts of FIGS. 6-12. As noted above, the user's posts and other activity of the user 102, and possibly from his or her friends 114, are indexed in user index 164. The intelligent processing modules 156 scan the index 164, analyze the information, and generate inferences about the user 102. The inferences may relate to a wide variety of information about the user. In one example, the intelligent processing modules 156 may be used to draw inferences regarding the user's emotional state, current trending interests, future plans, likes/dislikes and aspirations. These traits are by way of example only. Processing modules may be omitted for some of these traits, or processing modules may be provided for drawing inferences on alternative or additional traits in further examples.

In embodiments, a separate intelligent processing module 156 may be dedicated to each of these user traits. In embodiments, there may be some overlap between different intelligent processing modules, and information gleaned from one module 156 may be used by another module 156. In the following description, each flowchart relates to a different intelligent processing module, and each processing module is responsible for drawing inferences about a single user trait. However, it is understood that a single module 156 may be used to draw inferences on more than one trait. Alternatively, inferences for a single trait may be provided by multiple processing modules 156 working in tandem.

Figure 6:
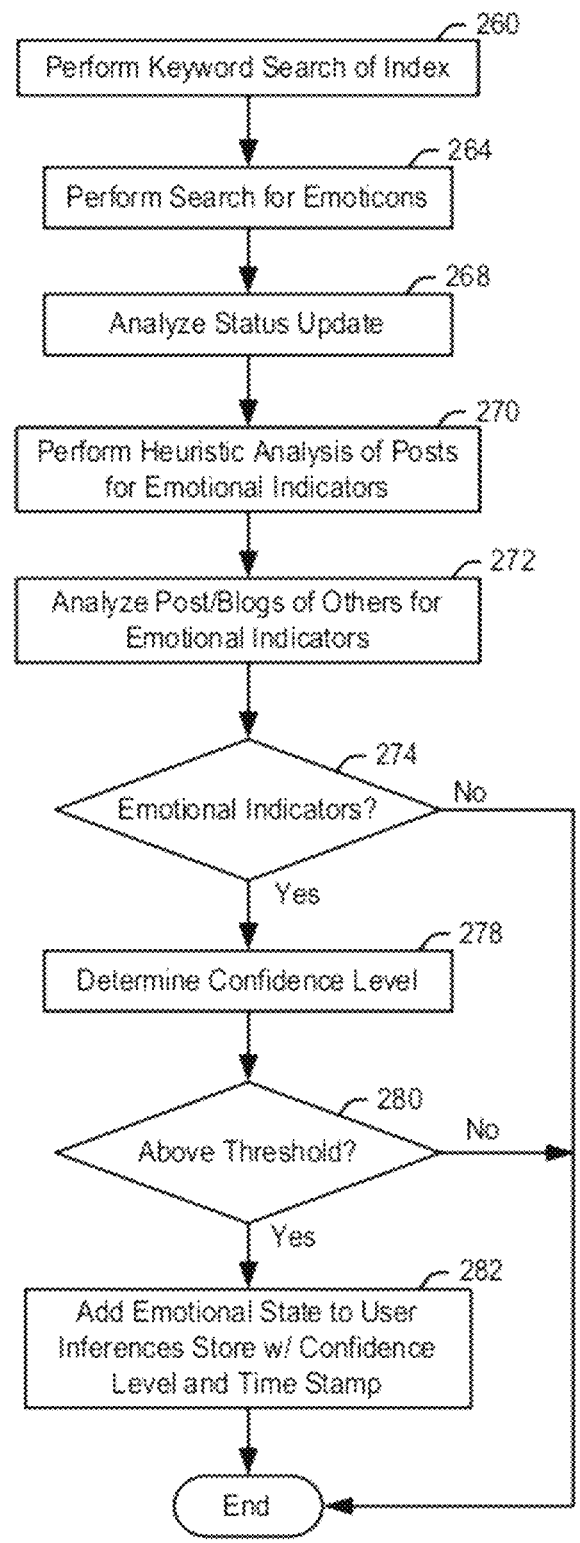
FIG. 6 is a flowchart for a first intelligent processing module of the user-following engine.

The flowchart of FIG. 6 relates to an intelligent processing module 156 for detecting a user's emotional state from the user 102 posts and possibly from the posts of user friends 114. In step 260, this intelligent processing module may perform a key word search of the index 164. A key word search may be common to many or all of the processing modules 156 described, though the particular key words searched may be different for the different processing modules 156. In the processing module 156 of FIG. 6, the module may search for key words tending to reveal information about a user's emotional state. These key words may include single words or multiple words and phrases. The rationale is that when a user is happy, they may be more likely to use certain words in their posts. The same may be true when the user is sad, mad, excited, scared, bored, etc. Studies exist which have classified words as representative of certain moods, and the processing module 156 of FIG. 6 may make use of such classifications. For example, the publication by Bradley, M. M., & Lang, P. J., entitled "Affective Norms for English Words (ANEW): Instruction Manual and Affective Ratings," Technical Report C-1, The Center for Research in Psychophysiology, University of Florida (1999) contains normative emotional ratings for 1034 English words. Each word in the dataset is associated with a rating of 1-9 along each of three dimensions of emotional affect: valence (pleasure vs. displeasure), arousal (excitement vs. calmness), and dominance (strength vs. weakness). Such ratings may be used in the key word search of step 260. The above-described publication is incorporated by reference herein in its entirety. Different methodologies may be applied for different spoken languages.

Another, possibly more objective indicator of the emotional state of the user 102 may be posts including emoticons. An emoticon is a textual or graphical expression provided by a user 102 generally to represent the user's mood or facial expression. Such emoticons may be searched for in the user index 164 in step 264. In step 268, the processing module 156 of FIG. 6 may further look for status updates recorded in index 164. In particular, many social media sites 106, 108 allow a user to set various status indicators, such as whether the user 102 is in a relationship or single, employed or unemployed, etc. A change in status may be an indicator of mood of the user 102. In step 270, the index 164 may be analyzed by applying a variety of other heuristic tests directed at revealing an emotional state from within the posts and/or other activities of the user on social media sites 106, 108.

In step 272, the posts of others may be analyzed to draw inferences about the mood of user 102. These others may be the user's friends 114. As indicated above, friends' posts are also stored in user index 164 and may include indicators of the mood of user 102 through their interaction with the user 102. The others whose posts are analyzed in step 272 may be completely unrelated to the user 102. It may happen that some event has occurred that large cross-sections of the general population are posting about. For example, the death of a popular figure, or the winning of a big game by a team, may result in posts by a large segment of a population on social media sites 106, 108. Where such an event is identified, and the user has posts about the event, it may be inferred that the user's mood mirrors that of the general public with respect to that event.

The above steps 260, 264, 268, 270 and 272 provide some examples of steps which may be performed by the intelligent processing module 156 for drawing inferences about a user's emotional state. It is understood that one or more of these steps may be omitted and that one or more other steps may be performed instead of or in addition to those steps in further embodiments.

In step 274, the module 156 checks whether inferences can be drawn regarding a user's emotional state based on the analysis steps performed as described above. If no such inference as to emotional state was identified, the processing module 156 of FIG. 6 ends. However, if some inference as to emotional state is identified, the processing module 156 may next check in step 278 if there is any indication of how strongly that emotional state is shown. This is referred to herein as a confidence level of a detected inference. A confidence level may be detected for example by the frequency with which emotional indicators appeared in the posts of the user 102 or his/her friends. Alternatively, a confidence level may be detected by a vehemence with which emotional indicators appeared in the posts of the user 102 or his/her friends. A formula may be provided for quantifying a confidence level based on these factors to provide a numerical confidence level in step 278.

In step 280, the module 156 may check whether the confidence level for emotional inferences is above some predetermined threshold. If not, then no emotional inferences are drawn. On the other hand, if the confidence level for emotional inferences is above some predetermined threshold, then the detected emotional state may be stored in the inferences store 172 of the user profile service in step 282. In particular, upon detecting an inference above the threshold, the processing module 156 causes data representative of the inference, and data representative of the confidence level, to be stored in the inferences store 172. In further embodiments, steps 278 and 280 relating to determining confidence levels and requiring confidence levels above a predetermined threshold may be omitted. In such embodiments, when an emotional state is detected from analyzing the indexed posts, data indicative of that emotional state is stored in inferences store 172 without regard to a confidence level.

Emotional states, as with other user traits, are time dependent. While a user may be happy or sad at present, the user may not have that emotional state a few hours or days later. Therefore, when storing an inferred emotional state in step 282, the module 156 of FIG. 6 may further store a time stamp at which that emotional state was detected. Using the time stamp as explained below, the likelihood that a detected emotional state will be used when customizing a search experience may decay over time. In alternative embodiment, instead of having a decay metric, the concept of time may be incorporated directly in to the determination of the confidence level. Inferences drawn from a post from minutes ago may have a higher confidence level than the same post made hours ago.

In embodiments, in addition to a time stamp, a predefined decay value may also be stored. In particular, some traits are more transitory than others. For example, a mood may change quickly, while an interest may tend to last a little longer. Thus, a scale for decay values may be arbitrarily defined with respect to different inferences, and that decay value also stored in association with a given inference. Some inferences may be receive a given decay value, such as for example zero, which indicates that the inference does not decay over time.

Figure 7:
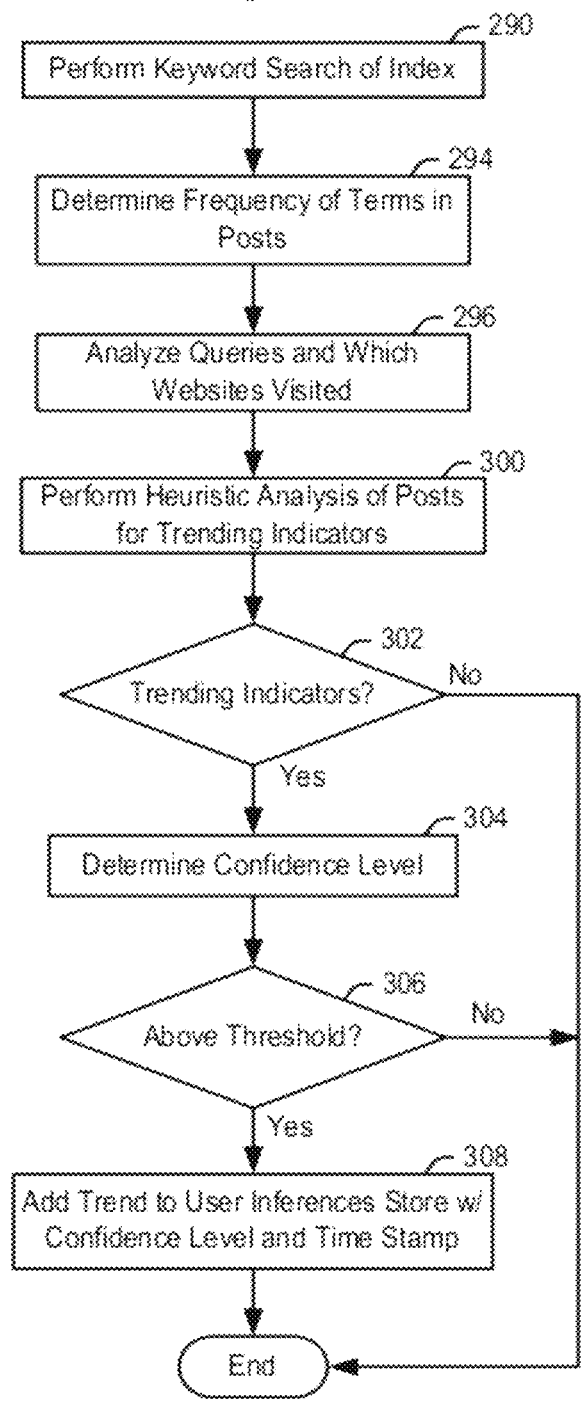
FIG. 7 is a flowchart for a second intelligent processing module of the user-following engine.

The flowchart of FIG. 7 relates to an intelligent processing module 156 for detecting a trending interest of the user 102. In particular, user 102 may have taken an interest in a particular topic. It could be a new song, album or artist. It could be a current event. It could be a new friendship, or field of study. It could be a wide variety of other topics related to any subject in which the user 102 is interested. This interest may be expressed in the user's posts to social media sites 106, 108. The user may talk about the interest, or the user may upload or look for a sample of the subject matter of interest.

One method of detecting a trending interest is by performing a key word search of the user's posts. In step 290, the intelligent processing module 156 of FIG. 7 may perform a key word search of the index 164 and in step 294, the module 156 may determine a frequency with which terms in the user's posts appear. The rationale is that when a user has a trending interest, that interest will appear in the user's posts with higher frequency.

The user may also enter search queries and explore websites (social media sites 106, 108 or other websites) relating to the trending interest. In step 296, the processing module of FIG. 7 may analyze queries and returned results from searches performed through search processing environment 130 to see if a trend is evident. This may also include analyzing the metadata regarding sites visited. In step 300, the user's posts, search queries and/or websites visited may be analyzed by applying a variety of other heuristic operations directed at revealing a trending interest from within the posts and/or other activities of the user. The posts from the user's friends 114 may also be analyzed in the same manner in an attempt to discern or confirm a trending interest of the user 102.

The above steps 290, 294, 296 and 300 provide some examples of steps which may be performed by the intelligent processing module 156 for drawing inferences about a user's trending interest. It is understood that one or more of these steps may be omitted and that one or more other steps may be performed instead of or in addition to those steps in further embodiments.

In step 302, the module 156 checks whether inferences can be drawn regarding a user's trending interest based on the analysis steps performed as described above. If no such inference as to trending interest was identified, the processing module 156 of FIG. 7 ends. However, if some inference as to trending interest is identified, that trending interest may be added to the inferences store 172 for user 102 in step 308. Optionally, the processing module 156 of FIG. 7 may further incorporate a requirement that the trending interest be found above some predetermined confidence level in steps 304 and 306 before the inference is added to the inferences store 172. If so, the confidence level may also be added to the inferences store 172. A time stamp of the drawn inference may also be stored in inferences store 172 together with the inference. As indicated above, a decay value may also be added. The time stamp or decay value may be reset when new or additional trending indicators are found over time.

Figure 8:
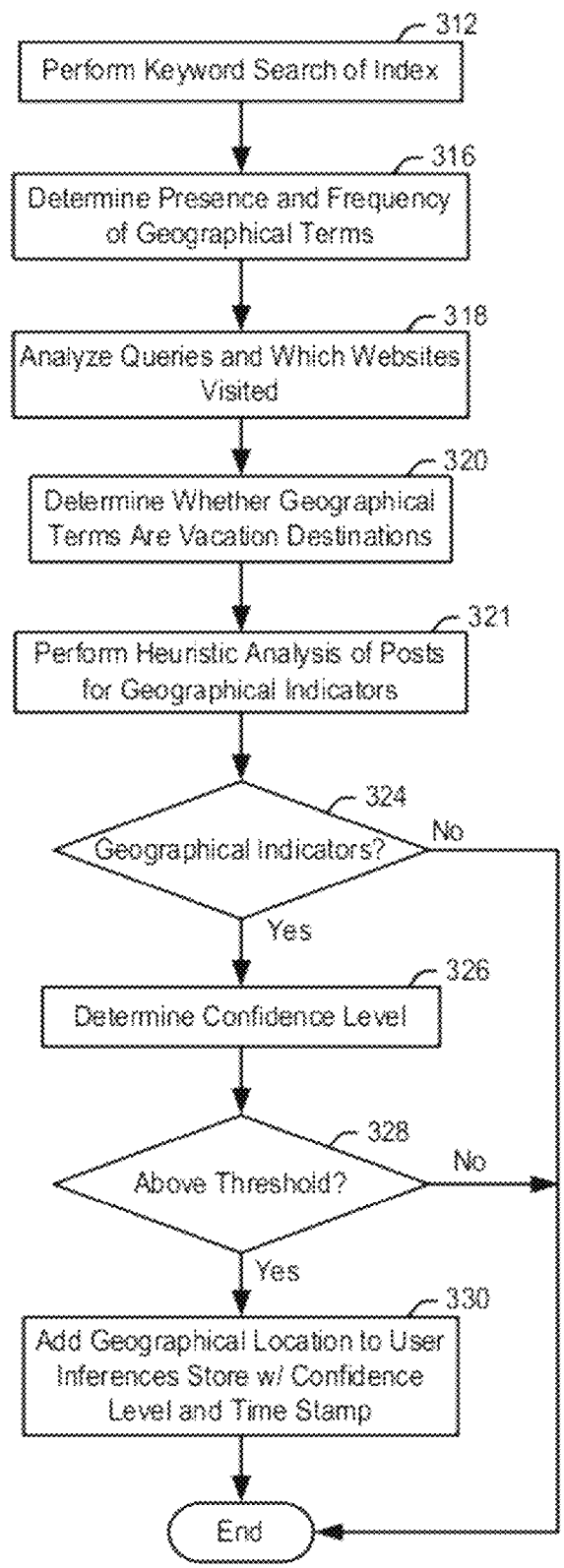
FIG. 8 is a flowchart for a third intelligent processing module of the user-following engine.

The flowchart of FIG. 8 relates to an intelligent processing module 156 for detecting geographic places of interest to the user 102. In particular, user 102 may be planning a trip, may be on a trip or may have returned from a trip. The geographic location may be somewhere that the user 102 is interested in, whether or not he or she plans to travel there. It could be a wide variety of other topics related to any geographic location that the user 102 is interested in. This interest may be expressed in the user's posts to social media sites 106, 108. The user may talk about the place of interest. The user may alternatively or additionally post about travel arrangements, accommodations and/or activities at a place of interest. The user may further upload or seek a sample of content relating to the place of interest.

In step 312, the intelligent processing module 156 of FIG. 8 may perform a key word search of the index 164 and in step 316, the module 156 may determine a frequency with which terms in the user's posts appear. The rationale is that when a user is interested in a geographic location, that interest will appear in the user's posts with higher frequency.

The user may also enter search queries and explore websites (social media sites 106, 108 or other websites) relating to the place of interest. In step 318, the processing module of FIG. 8 may analyze queries and returned results from searches performed through search processing environment 130 to see if a place of interest or travel plans are evident. The processing module 156 of FIG. 8 may further look in step 320 for the appearance and frequency in the user's posts of certain well known travel destinations, such as for example Hawaii, an African safari, locations in Europe or a wide variety of other places. In step 322, the user's posts, search queries and/or websites visited may be analyzed by applying a variety of other heuristic operations directed at revealing a place of interest from within the posts and/or other activities of the user.

The posts from the user's friends 114 may also be analyzed in the same manner in an attempt to discern or confirm a geographic place of interest of the user 102. It may happen that a user asks for help in finding a vacation spot or other place of interest. The replies from the user's friends may then help in determining if the user has found a particular place of interest.

The above steps 312, 316, 318, 320 and 322 provide some examples of steps which may be performed by the intelligent processing module 156 for drawing inferences about a geographic place of interest to user 102. It is understood that one or more of these steps may be omitted and that one or more other steps may be performed instead of or in addition to those steps in further embodiments.

In step 324, the module 156 checks whether inferences can be drawn regarding a place of interest based on the analysis steps performed as described above. If no such inference as to a geographic location was identified, the processing module 156 of FIG. 8 ends. However, if some inference as to a particular place of interest is identified, that place of interest may be added to the inferences store 172 for user 102 in step 330. Optionally, the processing module 156 of FIG. 8 may further incorporate a requirement that the geographic place of interest be found above some predetermined confidence level in steps 326 and 328 before the inference is added to the inferences store. If so, the confidence level may also be added to the inferences store 172. A time stamp of the drawn inference may also be stored in inferences store 172 together with the inference in step 330.

Figure 9:
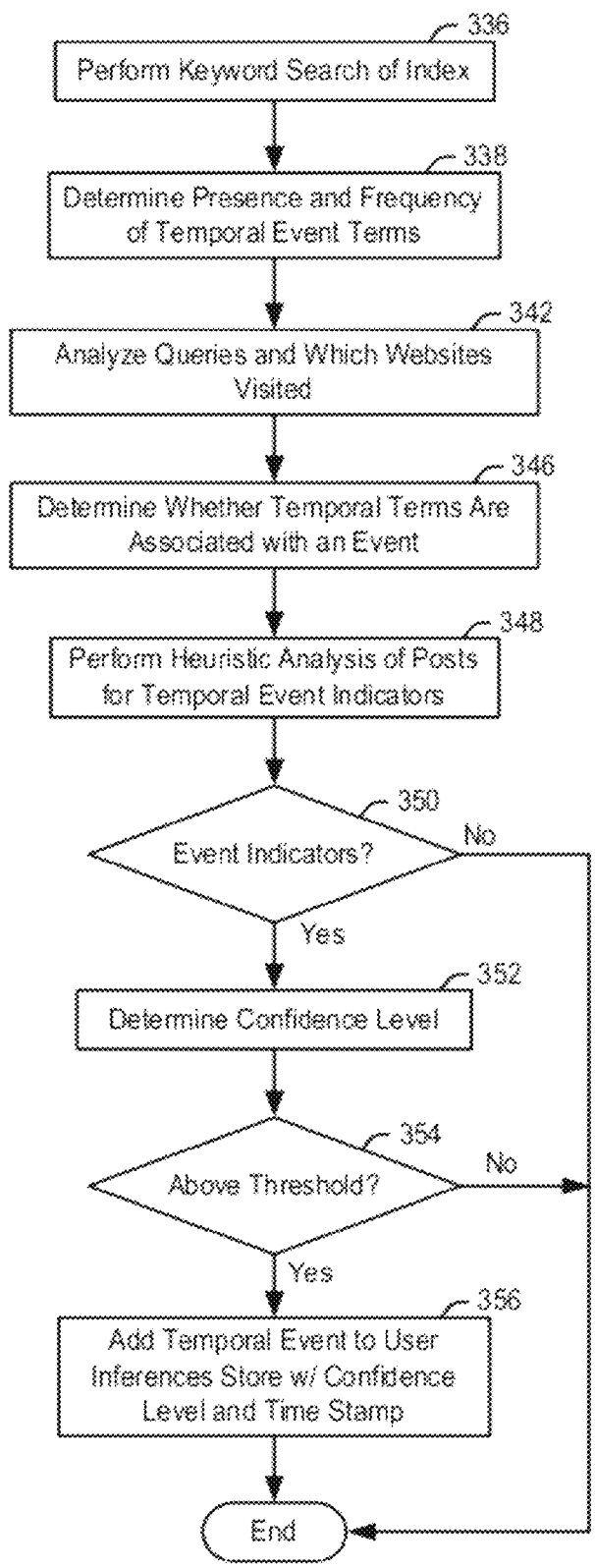
FIG. 9 is a flowchart for a fourth intelligent processing module of the user-following engine.

The flowchart of FIG. 9 relates to an intelligent processing module 156 for detecting a temporal event of interest to the user 102. In particular, user 102 may be planning a birthday, or going to a concert, or has an upcoming test in school or deadline at work. The event may be a regular periodic event, such as meeting for happy hour after work each Friday or other day of the week. It could be a wide variety of other topics related to any temporal event that the user 102 is interested in. This interest may be expressed in the user's posts to social media sites 106, 108. The user may talk about the event, or upload or seek a sample of content relating to the event.

In step 336, the intelligent processing module 156 of FIG. 9 may perform a key word search of the index 164 and in step 338, the module 156 may determine a frequency with which terms in the user's posts appear. If user 102 is interested in a temporal event, that interest may appear in the user's posts with higher frequency.

The user may also enter search queries and explore websites (social media sites 106, 108 or other websites) relating to the temporal event. In step 342, the processing module of FIG. 9 may analyze queries and returned results from searches performed through search processing environment 130 to see if an event is evident. The processing module 156 of FIG. 8 may further look in step 346 for the appearance and frequency of times and/or dates, and whether a given subject is associated with those times and/or dates. With periodic events, these events may become apparent over time by recognizing a repeating pattern in times and/or days of the week in posts of the user 102 or those of his or her friends 114. In step 348, the user's posts, search queries and/or websites visited may be analyzed by applying a variety of other heuristic operations directed at revealing an event of interest from within the posts and/or other activities of the user. The posts from the user's friends 114 may also be analyzed in the same manner in an attempt to discern or confirm a temporal event of interest to the user 102.

The above steps 336, 338, 342, 346 and 348 provide some examples of steps which may be performed by the intelligent processing module 156 for drawing inferences about a temporal event of interest to user 102. It is understood that one or more of these steps may be omitted and that one or more other steps may be performed instead of or in addition to those steps in further embodiments.

In step 350, the module 156 checks whether inferences can be drawn regarding a temporal event of interest based on the analysis steps performed as described above. If no such inference as to a temporal event was identified, the processing module 156 of FIG. 9 ends. However, if some inference as to a particular event is identified, that event may be added to the inferences store 172 for user 102 in step 356. Optionally, the processing module 156 of FIG. 9 may further incorporate a requirement that the event of interest be found above some predetermined confidence level in steps 352 and 354 before the inference is added to the inferences store. If so, the confidence level may also be added to the inferences store 172. A time stamp of the drawn inference may also be stored in inferences store 172 together with the inference in step 356.

Figure 10:
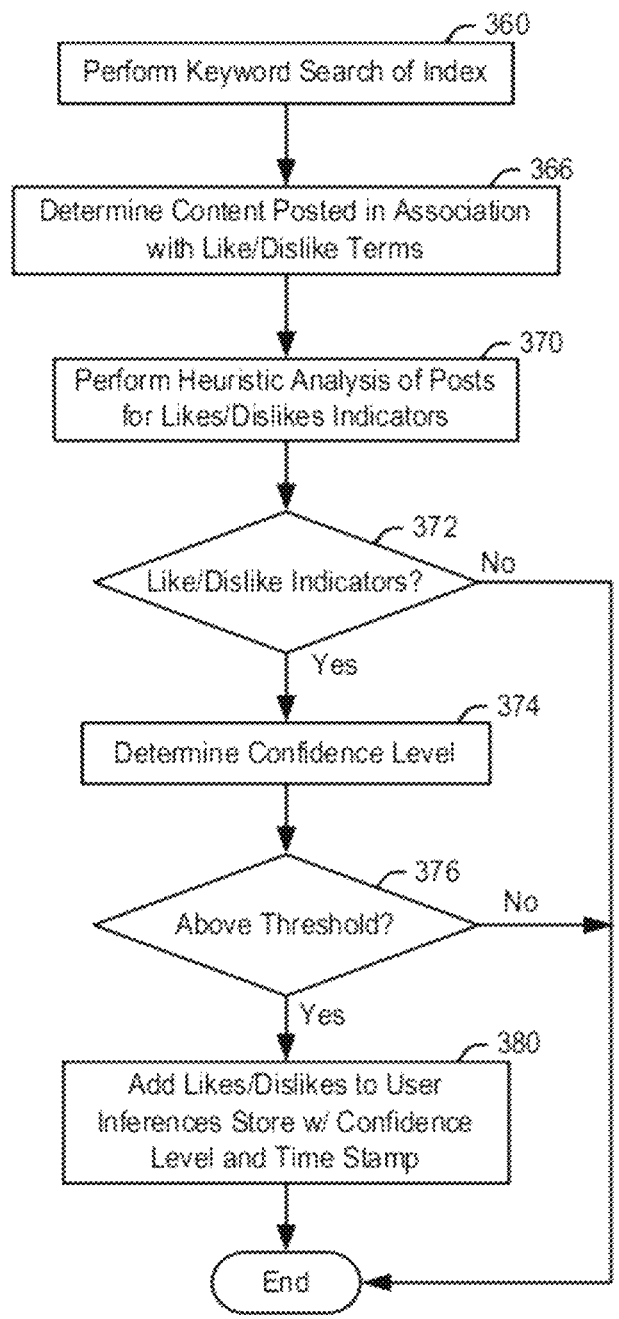
FIG. 10 is a flowchart for a fifth intelligent processing module of the user-following engine.

The flowchart of FIG. 10 relates to an intelligent processing module 156 for detecting likes and dislikes of the user 102. The user 102 may have an affinity or aversion to certain topics, people, brands, stores, organizations, places and/or things, and this affinity or aversion may be expressed in the user's posts to social media sites 106, 108. In step 360, the intelligent processing module 156 of FIG. 10 may perform a key word search of the index 164 to locate any of a wide variety of terms tending to indicate a like or dislike for something. The module 156 would also look for terms of negation in association with like/dislike terms so as to be able to distinguish between a user 102 posting for example, "I like . . . " and "I do not like . . . ". In step 366, the module 156 of FIG. 10 would look for a topic, person, place, thing, etc. associated with the like/dislike term.

In addition to searching for terms which tend to indicate a like or dislike, some social media sites 106, 108 allow a user to provide explicit indications of things they like or do not like. For example, some sites 106, 108 allow a user to indicate they are a "fan" of something. This intelligent processing module may also look to such explicit indications. This intelligent processing module may further search the frequency with which the user 102 posts regarding a particular topic, person, place, thing, etc. may also be an indicator of a like/dislike of the user. In this sense, the result from the intelligent processing module 156 for inferring trending interests of a user, discussed above with respect to FIG. 7, may also be used as an indicator for the intelligent processing module 156 for inferring likes and dislikes discussed here with respect to FIG. 10.

In step 370, the user posts may be analyzed by applying a variety of other heuristic operations directed at revealing likes and dislikes of the user 102 from within the posts and/or other activities of the user. The posts from the user's friends 114 may also be analyzed in the same manner in an attempt to discern or confirm the likes/dislikes of the user 102.

The above steps 360, 366 and 370 provide some examples of steps which may be performed by the intelligent processing module 156 for drawing inferences about the likes and dislikes of user 102. It is understood that one or more of these steps may be omitted and that one or more other steps may be performed instead of or in addition to those steps in further embodiments.

In step 372, the module 156 checks whether inferences can be drawn regarding what the user likes and dislikes based on the analysis steps performed as described above. If no such inference as to likes/dislikes was identified, the processing module 156 of FIG. 10 ends. However, if some inference as to an affinity or aversion of the user 102 is identified, that affinity/aversion may be added to the inferences store 172 for user 102 in step 380. Optionally, the processing module 156 of FIG. 10 may further incorporate a requirement that the affinity/aversion be found above some predetermined confidence level in steps 374 and 376 before the inference is added to the inferences store. If so, the confidence level may also be added to the inferences store 172. A time stamp of the drawn inference may also be stored in inferences store 172 together with the inference in step 380.

Figure 11:
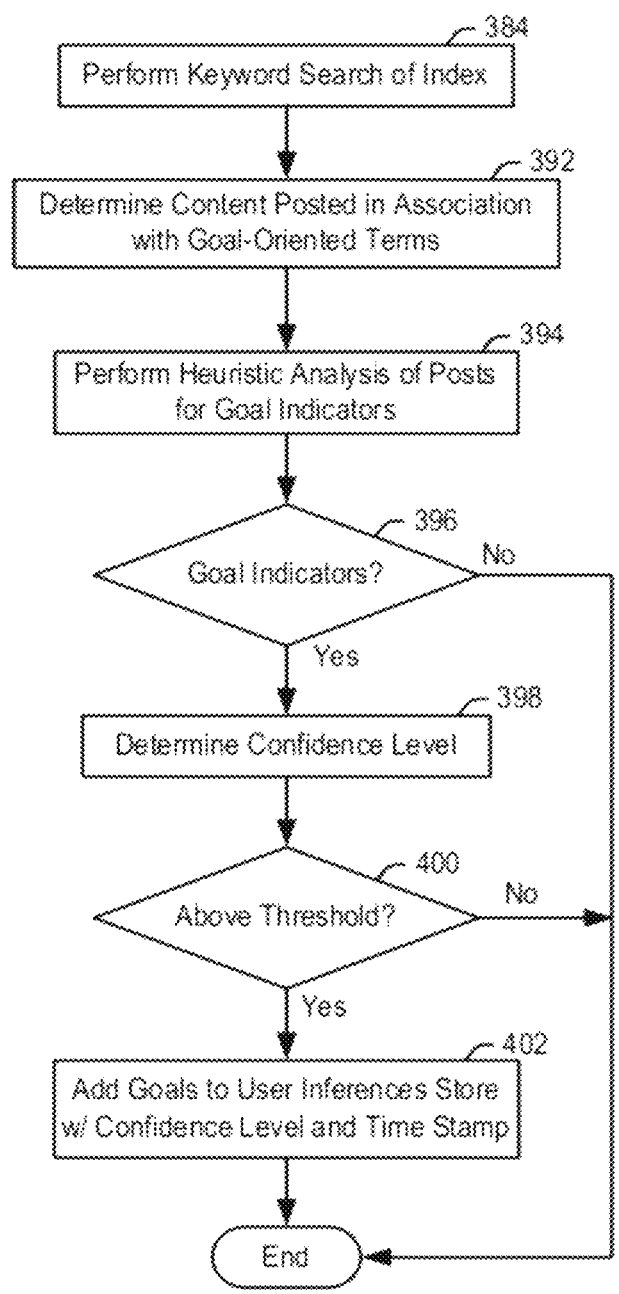
FIG. 11 is a flowchart for a sixth intelligent processing module of the user-following engine.

The flowchart of FIG. 11 relates to an intelligent processing module 156 for detecting a goal or aspiration of the user 102. The user may communicate posts including goal-oriented terms such as, "I want . . . " or "I wish . . . " or "I hope . . . " or "It would be great if . . . " or a variety of other terms or phrases which tend to indicate an aspiration of the user. In step 384, the intelligent processing module 156 of FIG. 11 may perform a key word search of the index 164 to locate any of a wide variety of terms/phrases tending to indicate a goal of the user. As described above, the module 156 of FIG. 11 may also look for terms of negation in association with goal-oriented terms so as to be able to distinguish between a user 102 posting for example, "I want . . . " and "I do not want. . . ". In step 392, the module 156 of FIG. 11 would look for a topic, person, place, thing, etc. associated with the goal-oriented term.

In step 394, the user posts may be analyzed by applying a variety of other heuristic operations directed at revealing goals of the user 102 from within the posts and/or other activities of the user. The posts from the user's friends 114 may also be analyzed in the same manner in an attempt to discern or confirm the goals of the user 102.

The above steps 384, 392 and 394 provide some examples of steps which may be performed by the intelligent processing module 156 for drawing inferences about the goals of user 102. It is understood that one or more of these steps may be omitted and that one or more other steps may be performed instead of or in addition to those steps in further embodiments.

In step 396, the module 156 checks whether inferences can be drawn regarding user goals based on the analysis steps performed as described above. If no such inference as to goals was identified, the processing module 156 of FIG. 11 ends. However, if some inference as to a user's goals is identified, that goal may be added to the inferences store 172 for user 102 in step 402. Optionally, the processing module 156 of FIG. 11 may further incorporate a requirement that the goal be found above some predetermined confidence level in steps 398 and 400 before the inference is added to the inferences store 172. If so, the confidence level may also be added to the inferences store 172. A time stamp of the drawn inference may also be stored in inferences store 172 together with the inference in step 402.

The above description of various intelligent processing modules 156 is provided by way of example only. It is appreciated that a variety of other intelligent processing modules using the above-described metrics or other metrics may be used to draw inferences about the user. While the above-described embodiments of modules 156 included a key word search, as noted above, the gathering engine 152 may also gather images, video and/or audio. Instead of or in addition to the key word search, known techniques may be performed for example to identify objects within images and video and/or words within audio. These recognized objects or words may then be used by the modules 156 to infer mood and intent as described above. The user-following engine 112 may be flexible so that intelligent processing modules 156 can be removed or modified dynamically, and new intelligent processing modules 156 can be plugged into the system dynamically.

The intelligent processing modules 156 described above are for the purpose of drawing inferences about one or more specific users 102. However, these intelligent processing modules and/or other intelligent processing modules may also be used to draw inferences about a group of people, which group inferences may be stored in the all users inferences store 172 of the all users profile service 176. The group of people for which group inferences apply may be as small as a few people and as large as a geographic region, country or global.

Group inferences may be drawn from a search of the all users index 178 of the all users profile service 176. The all users index 178 may be a full-text natural language actions index of the all user posts and other activities for all users stored in the user profile service 160.

Figure 12:
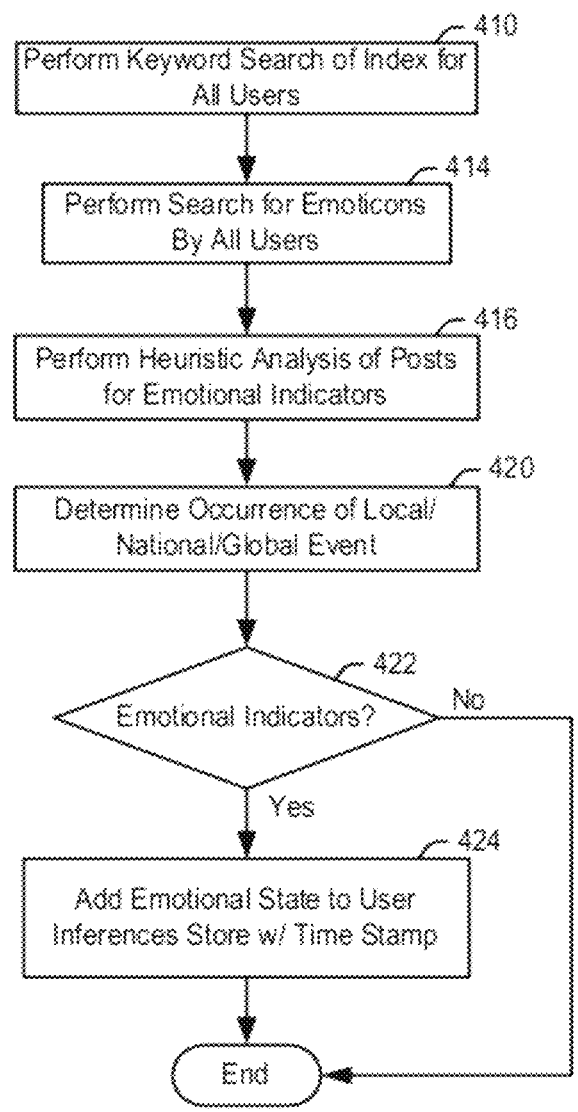
FIG. 12 is a flowchart for a first an intelligent processing module of the user-following engine for tracking a group of users
Figure 13:
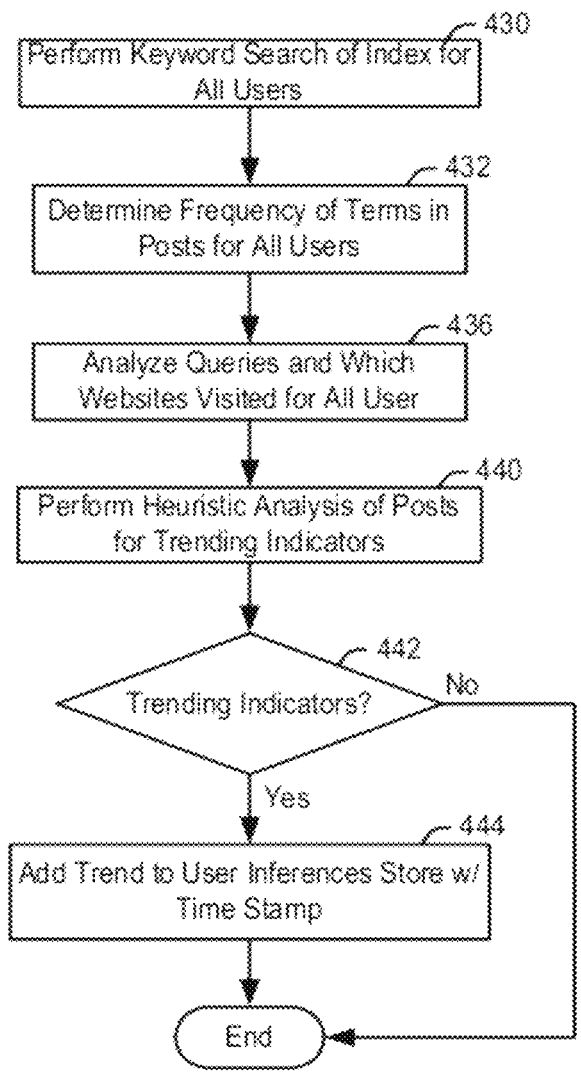
FIG. 13 is a flowchart for a second intelligent processing module of the user-following engine for tracking a group of users.

FIGS. 12 and 13 provide two examples of intelligent processing modules 156 which may be used to draw group inferences about a group of people. The module 156 described in FIG. 12 relates to gauging a mood for a population group. And the module 156 described in FIG. 13 relates to finding trending interests for a population group. It is understood that at least some of the other above-described intelligent processing modules may also be used or adapted for use in drawing inferences about a group.

Referring now to FIG. 12, the intelligent processing module 156 for detecting a mood for a population group may begin in step 410 by performing a key word search of the index 178. As noted above, the use of certain words may reveal information about a user's emotional state. When those state indicators are used by many users, this may reveal information about the emotional state of a group as a whole. The above-referenced publication "Affective Norms for English Words (ANEW)" is one known classification of terms which may be used in the key word search to detect the mood of a group of users. Different methodologies may be applied for different spoken languages. The frequency and use of emoticons by all users may also be determined in step 414. As noted above, the use of emoticons by one user may be indicative of a user's mood, and if a group of users all use the same or similar emoticons, this may be indicative of the group's mood. Various other heuristic analyses may be performed on the posts and activities of all users in index 178 in step 416.

Another indicator which may be used by processing module 156 in FIG. 12 is whether some notable event has occurred on a local, national or global level which would tend to inspire some mood such as happiness or sadness. Christmas or some other holiday may tend to inspire cheer, while the passing away of a popular figure may inspire sadness. The election of a politician to office may inspire cheer in a first group of users and sadness in a second group of users. In step 420, the occurrence of a local/national/global event is determined This can be used in conjunction with the analyses of steps 410, 414 and 420 to identify or confirm a mood of a group of users.

The above steps provide some examples of steps which may be performed by the intelligent processing module for drawing inferences about a group's mood or emotional state. It is understood that one or more of these steps may be omitted and that one or more other steps may be performed instead of or in addition to those steps in further embodiments.

In step 422, the module 156 checks whether inferences can be drawn regarding the mood of a group. If no such inference as to emotional state was found, the processing module 156 of FIG. 12 ends. However, if some inference as to emotional state is identified, the processing module 156 may store that inference in the group inferences store 182 in step 424 along with a time stamp. Threshold confidence values may be used in further embodiments as described above.

As discussed below, the location of users posting to social media sites 106, 108 may be known. Thus, in addition to identifying the emotional state of a group, the module 156 of FIG. 12 may further identify a location of the group. Moreover, from profile information available from user profiles (either in search processing environment 130 or scraped from social media sites 106, 108), different classifications of groups may be made. Thus, the module 156 may further cross-reference an identified emotional state for a group with other demographics of the group.

The flowchart of FIG. 13 relates to an intelligent processing module 156 for detecting a trending interest of a group of users. For example, a new anticipated movie or album may have been released, or some flood, earthquake, war or other catastrophe may have occurred. It could be a wide variety of other topics related to any subject of interest to a group of users. This interest may be expressed in the users' posts to social media sites 106, 108. Thus, in step 430, the intelligent processing module 156 of FIG. 13 may perform a key word search of the index 178 and in step 432, the module 156 may determine a frequency with which terms in the users' posts appear.

The processing module of FIG. 13 may analyze queries and returned results from searches in step 436 as explained above, and may apply other heuristics in step 440, to identify a trending interest from within the posts and/or other activities of a group of users. The steps of FIG. 13 are provided by way of example only. One or more of these steps may be omitted and one or more other steps may be performed instead of or in addition to those steps in further embodiments.

In step 442, the module 156 checks whether inferences can be drawn regarding a trending interest for a group based on the analysis steps performed as described above. If no such inference as to trending interest was found, the processing module 156 of FIG. 13 ends. However, if some inference as to a group trend is identified, the processing module 156 may store that inference in the group inferences store 182 in step 444 along with a time stamp. Threshold confidence values may be used in further embodiments as described above. Moreover, the trending interest may be cross-referenced against a given geographic location and other demographics as described above.

In addition to the all users index 178 and group inferences store 182, the all users profile service 176 may further keep a geo-location index 180. The index 180 may keep each user's "home location," making it possible to find what users out of all users are in a specific geo-location envelope. Each user's home location may be determined by asking the user, scraping it from their profile on one of the social media sites 106, 108, reading it from their profile on the search processing environment 130, or inferring it from their IP address. The home location may be granular down to a specific address or as broad as a geographic region such as a city.

The geo-location index 180 may further store an "action location," which is the location of the user when posting to a social media site 106, 108 or taking some other action that is stored in the user index 164 and all users index 178. The action location may be provided by a GPS locator associated with the computing devices used by user 102 when taking an action. If an action does not have a specific action location, it may be considered to be the user's home location.

The all users profile service 176 may further include an all users profile index 184 that allows queries against the all users profile service 176 to be filtered by specific profile values. This allows one or more of the intelligent processing modules 156, search processing environment 130 and possibly the privileged applications 192 (explained below) to make queries, such as "find all posts on Twitter by 30 to 35 year olds in Seattle containing the word 'Twilight.'"

With the above-described system, inferences may be drawn about a user or group of users by the user-following engine 112 and stored in data store 140. This information may then be used by a variety of applications, at least some of which are shown in FIG. 3.

In one example, the inferences stored in the user profile service 160 may be used to customize and personalize the search experience of user 102 when using the search processing environment 130. This feature is now explained with reference to the block diagram of FIG. 3, the flowchart of FIG. 14 and the screen shots of FIGS. 15 and 16. The user-following engine 112 may further include a customization engine 158 for reading the inferences from inferences store 172, and customizing the search experience for user 102. In a step 450, the customization engine 158 retrieves any stored inferences from inferences store 172. If no inferences are found (or if the inferences are not above a predetermined threshold confidence level for embodiments using a confidence level), the customization engine may perform no actions and the user search experience may continue unaffected by the present system.

On the other hand, if a user inference is found in inferences store 172, that inference may be used to customize the background of a graphical user interface presented by the search processing environment in step 456. For example, an inference may have been stored indicating that the user 102 is soon to take a trip. From the user's posts on social media sites 106, 108, the user-following engine 112 determined that the user has an upcoming trip, that the user is thinking about the trip often as evidenced by the frequency of posts about the trip, and/or that the user may be happy and excited about the trip. Based on these inferences, the customization engine 158 may select a customized background reflecting the user's upcoming trip.

As noted above, if a user has not used the search engine for some time after a given inference has been identified and stored, that inference may no longer be applicable. In step 458, the customization engine 158 may check the time stamp associated with an identified inference. If the time stamp is older than some predetermined length of time, the background may be reset to the default background in step 462, and the customization engine 158 returns to step 454 to look for any new inferences. The intelligent processing modules 156 may run periodically, such as for example once every few minutes, hours or days. The intelligent processing modules 156 for different user traits may run with different frequencies.

Figure 15:
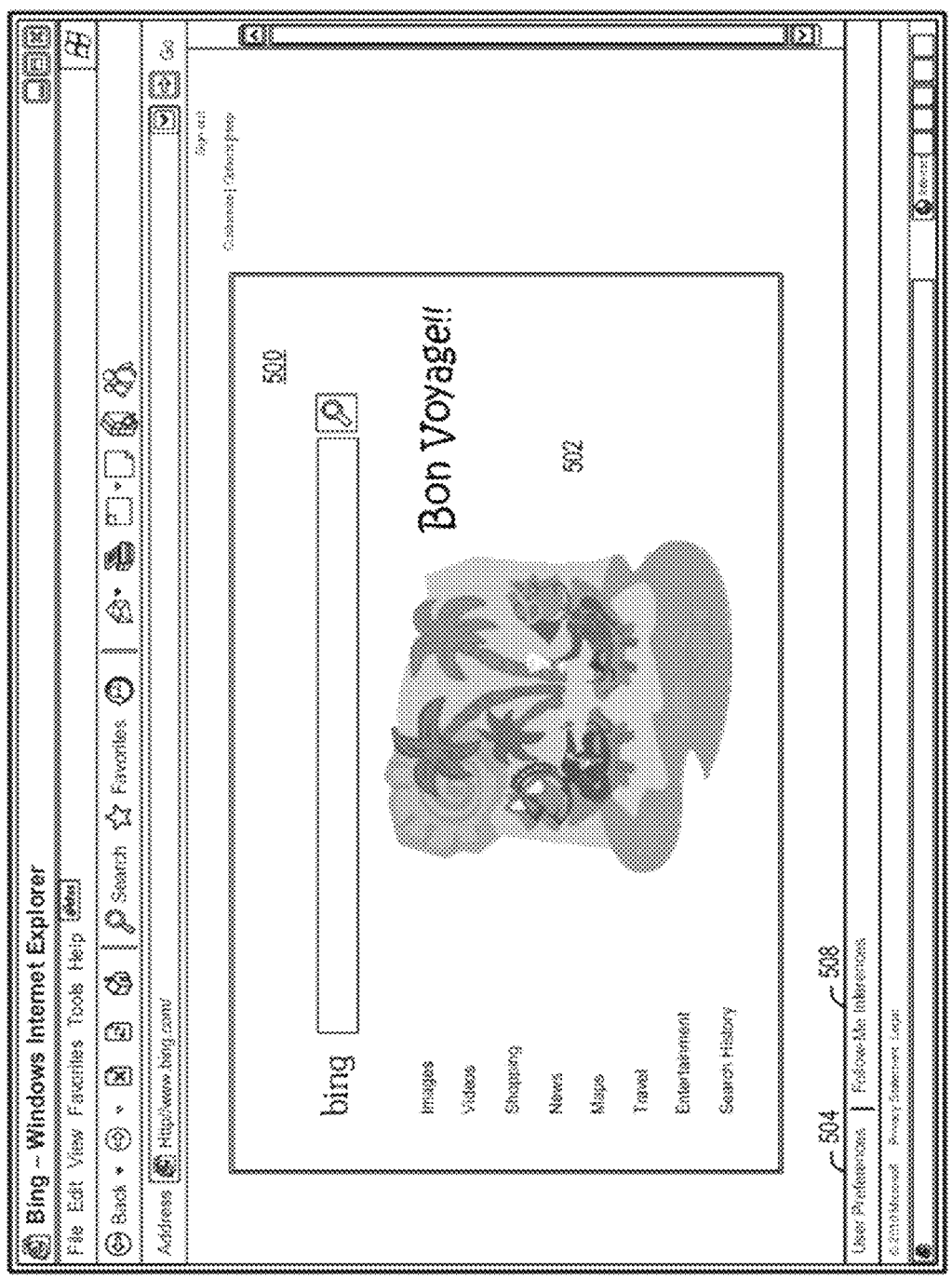
FIG. 15 is an illustration of a user interface showing a customized user interface according to an embodiment of the present system.

In step 464, the system awaits launch of the search engine 142 of search processing environment 130. Once the search engine is launched in step 464, a graphical user interface is displayed to the user in step 468 over a display. One example of such a graphical user interface (GUI) is GUI 500 shown in FIG. 15. The GUI 500 is by way of example and may have any of a wide variety of appearances. In this example, the GUI is customized with a background 502 selected by the customization engine from a stored inference. FIG. 15 also shows examples of a link 504 allowing a user to access and modify their user preferences, and a link 508 allowing a user to access and modify their inferences store 172.

Continuing with the example from above, the inferences store 172 had one or more stored inferences indicating that the user 102 was soon to take a trip. Thus, the customization engine selected a background 502 in FIG. 15 consistent with the user's interests and mood. It is understood that a wide variety of other backgrounds 502 may be selected, based on the inferences stored in inferences store 172. The background 502 may be customized as to image, color, tone, text and in other ways to better relate to a user's mood or interests. Images and text used for the background 502 may be stored in the data store 140 in association with particular user moods and interests. Thus, when an inference as to a mood and/or interest is identified, the customization engine 158 may populate the background 502 with the associated design. A user may also upload images, text, etc. that the user wishes to be presented with as background when certain inferences are drawn.

Figure 16:
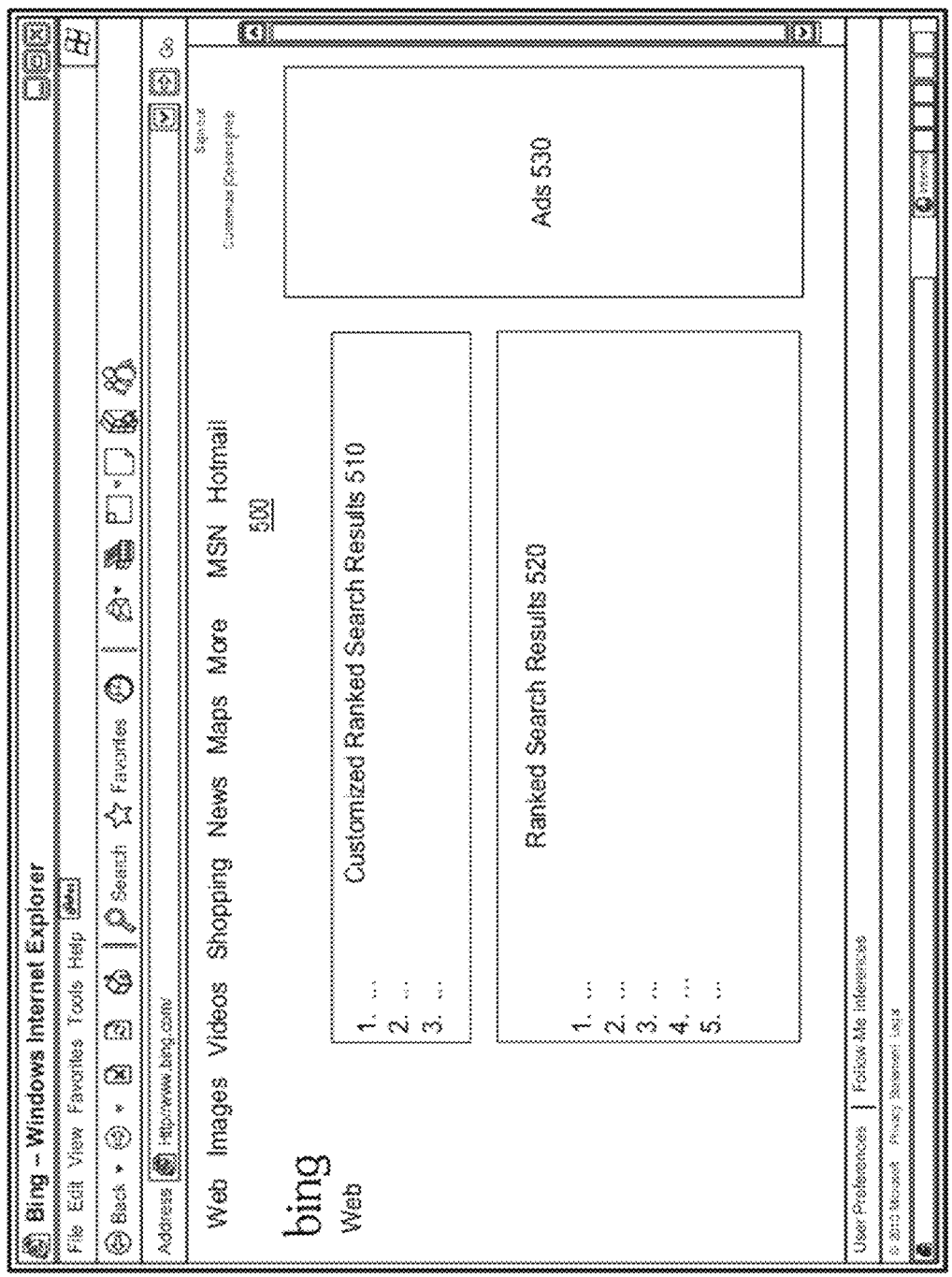
FIG. 16 is an illustration of a user interface showing a search result customized according to an embodiment of the present system.

In embodiments, the customization engine may also suggest one or more queries in step 474 based on the inferred user interests. In step 476, the search engine awaits a search query. Once a query is received, the search results for that query are obtained in step 480 and displayed to the user 102 on UI 500. FIG. 16 is an example GUI 500 showing the search results returned for a given query. In this example, the search returned a set of search results represented by block 510 customized per the inferred user interests/mood, and a set of search results represented by block 520 unaffected by the inferred user interests/mood. The number of results shown for both the customized results 510 and un-customized results 520 are by way of example only. The customized search results 510 may be customized in a number of ways, including weighting the search criteria differently to skew the results more toward those reflecting the inferred user interests.

In addition to skewing the search results to the user's inferred interests, the user-following engine 112 may further tailor the search results to a user's comprehension level. For example, an intelligent processing module 156 may be directed to discerning the sophistication and education level of the posts of a user 102. Based on that inference, the customization engine may vary the sophistication level of the customized search result 510. The user-following engine 112 is able to make determinations about comprehension level several ways, including from a user's posts and from a user's stored profile. In one example, the user-following engine 112 may discern whether a user is a younger student or an adult professional. In such an example, the user-following engine may tailor the results so that the professional receives results reflecting a higher comprehension level than the results for the student. Any of a wide variety of differentiations may be made. In a further example, the user-following engine may discern a particular specialty of the user, e.g., the user is a marine biologist or an avid cyclist. In such embodiments, a query from a user related to his or her particular area of specialty may return a more sophisticated set of results than the same query from a user not in that area of specialty.

Another feature of the present system is to allow advertisers not just to target a particular demographic group, but also to target that group further cross-referenced against an inferred user interest and/or mood. Advertisers may purchase space only to be shown to happy people, or people with an interest in a particular topic. Ads may be targeted to people who have recently evidenced an affinity toward a certain store or brand. Travel and hotel ads may be targeted to people who are interested in a particular geographic location. Where a temporal event inference is found showing a user will be at a particular venue at a particular date/time, ad specials for that venue (or competitive venues) may be presented to the user for that date/time. A wide variety of other possibilities are open to advertisers to take advantage of the inferences identified by the present system to target ads not just to a particular person, but to a particular person who has certain inferred interests or mood at a particular time. These advertisements may be displayed to the user in step 482, such as for example ad 530 in FIG. 15.

A further feature of the present system is the ability to disambiguate search results based on inferred user interests. Where for example a user has entered a search request relating to bikes, and one or more of the intelligent processing modules 156 have determined that the user is a mountain biking enthusiast, the search results may return results for bicycles instead of motorcycles. This disambiguation may be performed at step 486. As noted above, a user is able to modify his or her inferences store 172 in the event search results are skewed or disambiguated in a way that the user does not want.

While the present system has been described for use in customizing a search experience for a user, it is understood that the present system may be used to customize a user experience for other privileged applications 192 (FIG. 3). Privileged applications are those, including the search processing environment 130, having access to information obtained by the user-following engine 112. The appearance of the graphical user interface for other such privileged applications may be customized, such as for example providing a customized background as described above. Objects which are displayed to the user may at least in part be determined based on inferred user interests. Similarly, where user input may be ambiguous, the inferred user interests may be used to disambiguate the user input. In such embodiments, a privileged application 192 may have a user profile store 160 and an all users profile store 176 as described above, and the application 192 may make use of information from one or both stores 160 and 176.

Figure 14:
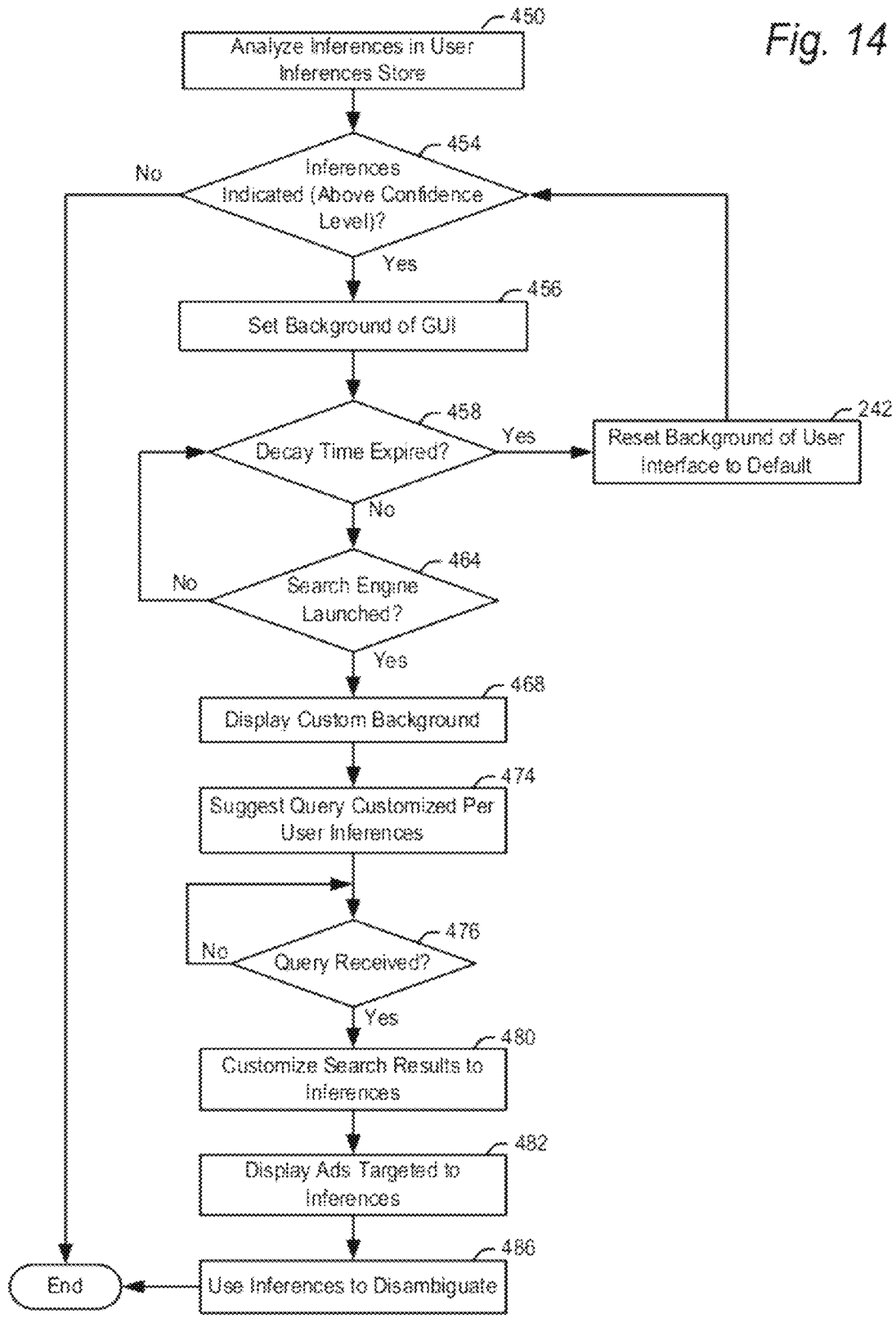
FIG. 14 is a flowchart showing the customizing of a search engine experience using the inferences from the user-following engine.

The flowchart of FIG. 14 described above illustrates how an application may make use of the inferences from a single user. However, as noted above, the present system also allows inferences to be drawn about groups of people. Various applications may make use of this information. In one such example, inferences drawn from the collective set of users may be used by a public opinion application 194 that infers public opinion on trending topics. The public opinion application 194 may read from the all users profile service 176 to determine public opinion about specific topics or entities.

In one such example, the public opinion application 194 may make use of the all users index 178 and geo-location index 180 to find and analyze all posts pertaining to a selected topic. This option may be used for fast-running jobs where the results need not be stored. Another method is to add an intelligent processing module that performs this processing and stores inferences about public opinion in the all users profile service inferences store 182. These inferences may then read by the public opinion application 194. This method may be used for complicated, slow-running analysis or when the inferences generated might be used repeatedly or by other applications.

The public opinion application 194 may be used to generate information regarding public opinion across an entire population. Alternatively, given the information in the geo-location index 180, the public opinion application 194 may obtain the opinion information broken down by different geographic regions, such as local communities, towns, cities or countries.

A further use of the present system may be in a prolific fan identification application 196. Such an application is able to identify users who are prolific and/or influential in their posting with respect to one or more topics. For such an application, an intelligent processing module 156 may be created which scans the index 178 of all user posts to find users who repeatedly post about a given topic. Another factor used by the intelligent processing module 156 of the fan identification application 196 may be how often others view a given user's posts and/or how often a given user's posts were repeated by others. From this information, inferences may be drawn as to the most influential users for a given topic. Advertisers or others looking to promote something related to that topic may be interested in this information, as well as possibly contacting and working with an identified influential poster.

As one example of the prolific fan identification application 196, a music recording artist may release a new album. The artist wants to tap into his most prolific fans, though he does not know who they are, and reward them for promoting his album. The user-following engine 112 would identify the users who repeatedly post about the artist, which information would be stored in the all users index 178 of the service 176. An intelligent processing module 156 may be provided which scores the selected users' posts for positive opinions of the artist. The number of readers who see, and possibly repeat, the users' posts may also be factored into the score. The highest scoring users could be given the opportunity to participate in a promotion. The artist would buy a promotion campaign, through the search processing environment 130 or elsewhere, giving each prolific fan a unique purchase URL for his album. The artist asks the fans to include their unique URL in their postings about the new album. The fan with the highest performing URL (measured via sales) would get a cash prize and the opportunity to meet the artist.

It is understood that the prolific fan identification application 196 may have a wide variety of other uses in further embodiments.

The information gathered and analyzed by the present system may be used in a wide variety of other instances and applications. In one further example, some search processing environments, such as Bing™ search engine software, have an email feature that delivers trending queries from others to an email inbox for user 102 on a regular basis. This communication can be enhanced by delivering trending queries that are related to the interests or mood of user 102. It could also be enhanced by delivering trending queries that fit the common interests of a user's friend group.

In general, by providing customized experiences for users, the present technology is able to gather a large knowledgebase containing interesting data points about many users. Using this as a platform, there are several opportunities to create new business value. In one further example, this knowledgebase can be used for applications like the Bing™ search engine software to provide users with better results when performing "people like you"-type searches.

Figure 17:
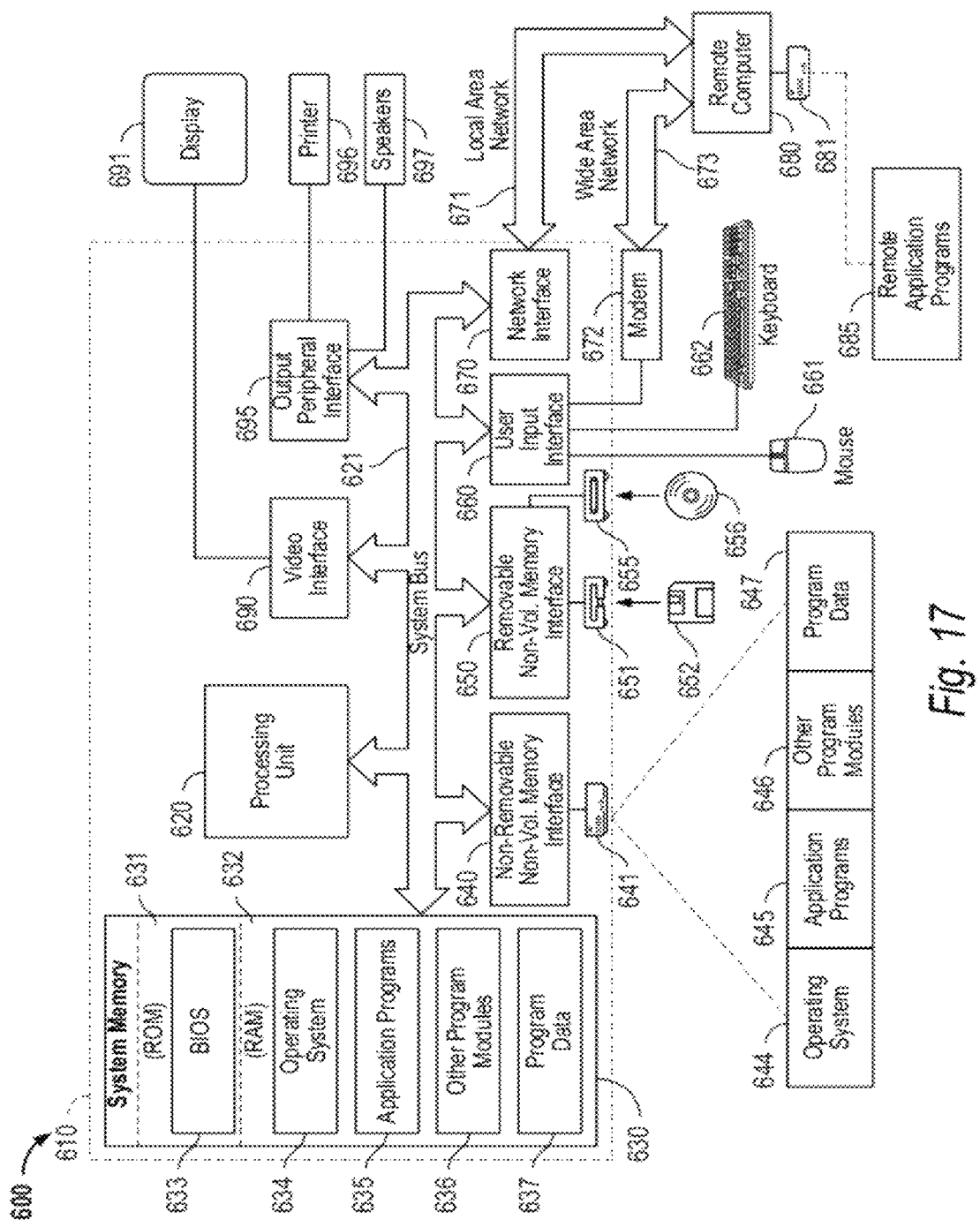
FIG. 17 is a block diagram of a sample computing device on which embodiments of the present system may be implemented.

FIG. 17 shows an exemplary computing system which may be any of the computing systems mentioned above. FIG. 17 shows a computer 610 including, but not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 17 illustrates operating system 634, application programs 635, other program modules 636, and program data 637.

The computer 610 may also include other removable/non-removable, volatile/nonvolatile computer storage media. By way of example only, FIG. 17 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 17, provide storage of computer readable instructions, data structures, program modules and other data for the computer 610. In FIG. 17, for example, hard disk drive 641 is illustrated as storing operating system 644, application programs 645, other program modules 646, and program data 647. These components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 17. The logical connections depicted in FIG. 17 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 17 illustrates remote application programs 685 as residing on memory device 681. It will be appreciated that the network connections shown are exemplary and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:
1. A method of enhancing a user interaction with a search engine application, the search engine application including a graphical user interface including a query box for entry of a query and a background image around or behind the query box, comprising:
   (a) following the online activity of a user within one or more social media sites;
   (b) analyzing the user activity within the social media sites followed in said step (a) to detect a current event or an event upcoming which is personal to the user; and
   (c) customizing the background image around or behind the query box in the graphical user interface based on the current or upcoming event of the user detected in said step (b), said customizing step comprising the step of customizing the background of the graphical user interface for the search engine application to include at least one of graphics and text related to the current or upcoming event personal to the user detected in said step (b).

2. The method of claim 1, further comprising the step of analyzing the user activity on the social media sites followed in said step (a) to correlate the user's activity with the user's interests.

3. The method of claim 2, said step (b) of analyzing the user activity on the social media sites comprising the step of analyzing the user posts on the one or more social media sites to detect indicators of the users interests and/or mood.

4. The method of claim 3, said step of analyzing the user posts on the one or more social media sites to detect indicators of the user's interests and/or mood comprising the step of performing at least one of a key word search of text, object recognition of graphics and video and speech recognition of audio on content or metadata associated with that content to determine the presence and frequency of key words, objects and speech.

5. The method of claim 2, said step (b) further comprising the step of following the online activity of one or more friends to aid in determining the user's interest and/or mood.

6. The method of claim 3, said step of analyzing the user posts on the one or more social media sites to detect indicators of the user's interests and/or mood comprising the step of analyzing user posts on the one or more social media sites to detect indicators of emotion, trending interests, geographical interests, temporal event interests, affinities, aversions and aspirations.

7. The method of claim 1, said step (a) of following the online activity of a user on one or more social media sites comprising the step of obtaining an ID of a user on the one or more social media sites and copying the user posts into an index containing all user posts.

8. A method of enhancing a user interaction with a search engine application, the search engine application including a graphical user interface including a query box for entry of a query and a background image around or behind the query box, comprising:
   (a) following the online activity of a user within one or more social media sites;
   (b) analyzing the user activity within the one or more social media sites followed in said step (a) to detect temporal event that is personal to the user; and
   (c) customizing the background image around or behind the query box in the graphical user interface based on the event of the user detected in said step (b), said customizing step comprising the step of customizing the background of the graphical user interface for the search engine application to include at least one of graphics and text related to the event personal to the user detected in said step (b).

9. The method of claim 8, said step (b) of analyzing the user activity on the social media sites comprising the step of analyzing the user posts on the one or more social media sites to detect indicators of the users interests and/or mood.

10. The method of claim 9, said step of analyzing the user posts on the one or more social media sites to detect indicators of the user's interests and/or mood comprising the step of performing at least one of a key word search of text, object recognition of graphics and video and speech recognition of audio on content or metadata associated with that content to determine the presence and frequency of key words, objects and speech.

11. The method of claim 9, said step of analyzing the user posts on the one or more social media sites to detect indicators of the user's interests and/or mood comprising the step of analyzing user posts on the one or more social media sites to detect indicators of emotion, trending interests, geographical interests, temporal event interests, affinities, aversions and aspirations.

12. The method of claim 8, further comprising the step of analyzing the user activity on the social media sites followed in said step (a) to correlate the user's activity with the user's interests.

13. The method of claim 12, said step (b) further comprising the step of following the online activity of one or more friends to aid in determining the user's interest and/or mood.

14. The method of claim 8, said step (a) of following the online activity of a user on one or more social media sites comprising the step of obtaining an ID of a user on the one or more social media sites and copying the user posts into an index containing all user posts.

* * * * *